United States Patent
Tinianov et al.

(10) Patent No.: US 12,248,225 B2
(45) Date of Patent: Mar. 11, 2025

(54) SOLAR POWER DYNAMIC GLASS FOR HEATING AND COOLING BUILDINGS

(71) Applicant: View, Inc., Milpitas, CA (US)

(72) Inventors: Brandon Dillan Tinianov, Santa Clara, CA (US); Dhairya Shrivastava, Los Altos, CA (US); Stephen Clark Brown, San Mateo, CA (US); Erich Robert Klawuhn, Santa Barbara, CA (US)

(73) Assignee: View Operating Corporation, San Jose, CA (US)

( * ) Notice: Subject to any disclaimer, the term of this patent is extended or adjusted under 35 U.S.C. 154(b) by 0 days.

(21) Appl. No.: 18/589,033

(22) Filed: Feb. 27, 2024

(65) Prior Publication Data
US 2024/0201554 A1   Jun. 20, 2024

Related U.S. Application Data

(63) Continuation of application No. 18/131,682, filed on Apr. 6, 2023, now Pat. No. 11,947,234, which is a
(Continued)

(51) Int. Cl.
*G02F 1/163* (2006.01)
*E06B 9/24* (2006.01)
(Continued)

(52) U.S. Cl.
CPC .............. *G02F 1/163* (2013.01); *E06B 9/24* (2013.01); *H02J 3/32* (2013.01); *H02J 3/381* (2013.01);
(Continued)

(58) Field of Classification Search
CPC .......... G02F 1/163; H02S 20/32; H02S 40/20; H02S 40/32; H02S 40/38; H02S 50/00;
(Continued)

(56) References Cited

U.S. PATENT DOCUMENTS

| 4,553,085 A | 11/1985 | Canzano |
| 5,242,313 A | 9/1993 | Logerot et al. |

(Continued)

FOREIGN PATENT DOCUMENTS

| CN | 101128783 A | 2/2008 |
| CN | 103155330 A | 6/2013 |

(Continued)

OTHER PUBLICATIONS

Bradley. A, "DeviceNet Media—Design and Installation Guide", Internet Citation, Jul. 1, 2004, pp. 128, XP002384552, Retrieved from the Internet: URL: http://literature.rockwellautomation.com/idc/groups/literature/documents/um/dnet-um072 -en-p.pdf[retrieved on Jun. 9, 2006].

(Continued)

*Primary Examiner* — Robert L Deberadinis
(74) *Attorney, Agent, or Firm* — Weaver Austin Villeneuve & Sampson LLP; Brian D. Griedel

(57) ABSTRACT

Various embodiments herein relate to systems for powering electrochromic windows in a building. Systems may include photovoltaic panels configured to generate electrical power, energy storage device(s) configured for storing generated power, and one or more controllers on a network of electrochromic windows that are configured to receive power from the energy storage device(s) and power tint transitions in one or more electrochromic windows. Systems may include various additional circuit components described herein for regulating and/or controlling the generation, storage, and application of electric power. The systems and techniques described herein can be used to design networks of electrochromic windows that are hybrid-solar or off-the-grid ("OTG").

27 Claims, 12 Drawing Sheets

Related U.S. Application Data continuation of application No. 17/721,187, filed on Apr. 14, 2022, now Pat. No. 11,656,521, which is a continuation of application No. 16/486,113, filed as application No. PCT/US2018/018241 on Feb. 14, 2018, now Pat. No. 11,320,713.

(60) Provisional application No. 62/459,991, filed on Feb. 16, 2017.

(51) Int. Cl.
| | |
|---|---|
| *H02J 3/32* | (2006.01) |
| *H02J 3/38* | (2006.01) |
| *H02S 20/32* | (2014.01) |
| *H02S 40/20* | (2014.01) |
| *H02S 40/32* | (2014.01) |
| *H02S 40/38* | (2014.01) |
| *H02S 50/00* | (2014.01) |

(52) U.S. Cl.
CPC .............. *H02S 20/32* (2014.12); *H02S 40/20* (2014.12); *H02S 40/32* (2014.12); *H02S 40/38* (2014.12); *H02S 50/00* (2013.01); *E06B 2009/2464* (2013.01); *H02J 2300/26* (2020.01)

(58) Field of Classification Search
CPC ...... E06B 9/24; E06B 2009/2464; H02J 3/32; H02J 3/38; H02J 3/381; H02J 2300/26
See application file for complete search history.

(56) References Cited

U.S. PATENT DOCUMENTS

| | | | |
|---|---|---|---|
| 5,477,152 | A | 12/1995 | Hayhurst |
| 6,055,089 | A | 4/2000 | Schulz et al. |
| 6,066,801 | A | 5/2000 | Kodaira et al. |
| 6,084,758 | A | 7/2000 | Clarey et al. |
| 6,232,557 | B1 | 5/2001 | Lounsbury et al. |
| 6,344,748 | B1 | 2/2002 | Gannon |
| 6,707,590 | B1 | 3/2004 | Bartsch |
| 6,848,933 | B1 | 2/2005 | Delaney, III et al. |
| 7,672,104 | B2 | 3/2010 | Reynolds et al. |
| 8,140,276 | B2 | 3/2012 | Walters et al. |
| 8,213,074 | B1 | 7/2012 | Shrivastava et al. |
| 8,800,221 | B1 | 8/2014 | Header |
| 8,963,378 | B1 | 2/2015 | Fornage et al. |
| 9,225,286 | B1 | 12/2015 | Tweedie |
| 9,250,494 | B2 | 2/2016 | Podbelski et al. |
| 9,454,055 | B2 | 9/2016 | Brown et al. |
| 10,253,558 | B2 | 4/2019 | Vigano et al. |
| 10,365,532 | B2 | 7/2019 | Vigano et al. |
| 10,704,322 | B2 | 7/2020 | Vigano et al. |
| 10,720,766 | B2 | 7/2020 | Krammer et al. |
| 10,746,761 | B2 | 8/2020 | Rayman et al. |
| 10,859,887 | B2 | 12/2020 | Vigano et al. |
| 11,320,713 | B2 | 5/2022 | Tinianov et al. |
| 11,384,596 | B2 | 7/2022 | Shrivastava et al. |
| 11,566,468 | B2 | 1/2023 | Vigano et al. |
| 11,656,521 | B2 | 5/2023 | Tinianov et al. |
| 11,681,197 | B2 | 6/2023 | Shrivastava et al. |
| 11,947,234 | B2 | 4/2024 | Tinianov et al. |
| 2001/0005083 | A1 | 6/2001 | Serizawa et al. |
| 2003/0072144 | A1 | 4/2003 | Malkowski et al. |
| 2006/0158805 | A1 | 7/2006 | Malvino |
| 2006/0202648 | A1 | 9/2006 | O'Higgins et al. |
| 2007/0135971 | A1 | 6/2007 | Andarawis et al. |
| 2007/0188841 | A1 | 8/2007 | Moeller et al. |
| 2008/0019068 | A1 | 1/2008 | Reynolds et al. |
| 2009/0222223 | A1 | 9/2009 | Walters et al. |
| 2011/0046810 | A1 | 2/2011 | Bechtel et al. |
| 2011/0255142 | A1 | 10/2011 | Ash et al. |
| 2011/0304899 | A1 | 12/2011 | Kwak et al. |
| 2012/0062975 | A1 | 3/2012 | Mehtani et al. |
| 2012/0239209 | A1 | 9/2012 | Brown et al. |
| 2012/0275008 | A1 | 11/2012 | Pradhan et al. |
| 2012/0293855 | A1 | 11/2012 | Shrivastava et al. |
| 2013/0271812 | A1 | 10/2013 | Brown et al. |
| 2013/0271814 | A1 | 10/2013 | Brown |
| 2014/0236323 | A1 | 8/2014 | Brown et al. |
| 2014/0268287 | A1 | 9/2014 | Brown et al. |
| 2014/0300945 | A1 | 10/2014 | Parker |
| 2014/0330538 | A1 | 11/2014 | Conklin et al. |
| 2014/0349497 | A1 | 11/2014 | Brown et al. |
| 2014/0368899 | A1 | 12/2014 | Greer |
| 2015/0002919 | A1 | 1/2015 | Jack et al. |
| 2015/0060648 | A1 | 3/2015 | Brown et al. |
| 2015/0109653 | A1 | 4/2015 | Greer et al. |
| 2015/0219975 | A1 | 8/2015 | Phillips et al. |
| 2015/0253367 | A1 | 9/2015 | Flammer, III et al. |
| 2015/0378231 | A1 | 12/2015 | Greer et al. |
| 2016/0054633 | A1 | 2/2016 | Brown et al. |
| 2016/0054634 | A1 | 2/2016 | Brown et al. |
| 2016/0124283 | A1 | 5/2016 | Brown et al. |
| 2016/0154290 | A1 | 6/2016 | Brown et al. |
| 2016/0231354 | A1 | 8/2016 | Rayman et al. |
| 2017/0063429 | A1 | 3/2017 | Flask |
| 2017/0075183 | A1 | 3/2017 | Brown |
| 2017/0075323 | A1 | 3/2017 | Shrivastava et al. |
| 2017/0077988 | A1 | 3/2017 | Flask |
| 2017/0082903 | A1 | 3/2017 | Vigano et al. |
| 2017/0097259 | A1 | 4/2017 | Brown et al. |
| 2017/0122802 | A1 | 5/2017 | Brown et al. |
| 2017/0131610 | A1 | 5/2017 | Brown et al. |
| 2017/0146884 | A1 | 5/2017 | Vigano et al. |
| 2017/0212400 | A1 | 7/2017 | Shrivastava et al. |
| 2017/0285433 | A1 | 10/2017 | Shrivastava et al. |
| 2018/0129172 | A1 | 5/2018 | Shrivastava et al. |
| 2019/0203528 | A1 | 7/2019 | Vigano et al. |
| 2019/0294017 | A1 | 9/2019 | Vigano et al. |
| 2020/0318426 | A1 | 10/2020 | Vigano et al. |
| 2021/0063835 | A1 | 3/2021 | Vigano et al. |
| 2021/0246719 | A1 | 8/2021 | Shrivastava et al. |
| 2021/0405493 | A1 | 12/2021 | Tinianov et al. |
| 2022/0244610 | A1 | 8/2022 | Tinianov et al. |
| 2022/0298850 | A1 | 9/2022 | Shrivastava et al. |
| 2022/0316269 | A1 | 10/2022 | Shrivastava et al. |
| 2023/0074720 | A1 | 3/2023 | Brown et al. |
| 2023/0107673 | A1 | 4/2023 | Vigano et al. |
| 2023/0244118 | A1 | 8/2023 | Tinianov et al. |
| 2023/0341740 | A1 | 10/2023 | Shrivastava et al. |
| 2024/0142843 | A1 | 5/2024 | Vigano et al. |

FOREIGN PATENT DOCUMENTS

| | | |
|---|---|---|
| CN | 103283102 A | 9/2013 |
| CN | 203204328 U | 9/2013 |
| CN | 104364706 A | 2/2015 |
| CN | 105431772 A | 3/2016 |
| CN | 105974160 A | 9/2016 |
| CN | 106164973 A | 11/2016 |
| CN | 205743507 U | 11/2016 |
| CN | 108139644 A | 6/2018 |
| FR | 2643512 A1 | 8/1990 |
| KR | 20150008414 A | 1/2015 |
| TW | M368189 U | 11/2009 |
| TW | 201351010 A | 12/2013 |
| TW | 201447089 A | 12/2014 |
| TW | 201510605 A | 3/2015 |
| TW | M504418 U | 7/2015 |
| TW | 201606409 A | 2/2016 |
| TW | I567469 B | 1/2017 |
| WO | WO-2006089718 A2 | 8/2006 |
| WO | WO-2006089718 A3 | 1/2007 |
| WO | WO-2013055457 A1 | 4/2013 |
| WO | WO-2013158365 A1 | 10/2013 |
| WO | WO-2013177575 A1 | 11/2013 |
| WO | WO-2014102198 A1 | 7/2014 |
| WO | WO-2015134789 A1 | 9/2015 |
| WO | WO-2015171886 A1 | 11/2015 |
| WO | WO-2016004109 A1 | 1/2016 |
| WO | WO-2016086017 A1 | 6/2016 |
| WO | WO-2017007841 A1 | 1/2017 |
| WO | WO-2017007942 A1 | 1/2017 |

(56) References Cited

FOREIGN PATENT DOCUMENTS

| WO | WO-2017059362 A1 | 4/2017 |
|---|---|---|
| WO | WO-2018019473 A1 | 2/2018 |
| WO | WO-2018112095 A2 | 6/2018 |
| WO | WO-2018152249 A1 | 8/2018 |
| WO | WO-2019203931 A1 | 10/2019 |

OTHER PUBLICATIONS

CA Office Action dated Nov. 9, 2022 in Application No. CA20162998861.
CA Office Action dated Dec. 1, 2022 in Application No. CA2998861.
CA Office Action dated Nov. 2, 2023 in CA Application No. CA3045443.
CA Office Action dated Sep. 26, 2023, in Application No. CA2998861.
Chinese Office Action & Search Report dated Aug. 3, 2020 in CN Application No. 201680060052.5.
Chinese Office Action & Search Report dated Mar. 25, 2021 in CN Application No. 201680060052.5.
CN Office Action dated May 5, 2022, in Application No. CN201780080267.8 With English Translation.
CN Office Action dated Feb. 16, 2022, in CN Application No. 201680060052.5 with English Translation.
CN Office Action dated Jul. 28, 2021, in CN Application No. 201680060052.5.
CN Office Action dated Jul. 28, 2023, in Application No. CN201980031543 with English translation.
CN Office Action dated Mar. 30, 2023 in Application No. CN201980031543 with English translation.
CN Office Action dated Sep. 28, 2021, in application No. CN201780080267.8 with English translation.
EP Extended European Search report dated Mar. 4, 2024 in EP Application No. 23187299.5.
EP office action dated Jun. 29, 2023, in application No. EP19787808.5.
EP Search Report dated Dec. 10, 2021, in Application No. EP19787808.5.
European Extended Search Report dated Apr. 18, 2019 in EP Application No. 16847427.8.
European Extended Search Report dated Jul. 3, 2020 in EP Application No. 17875406.5.
European Office Action dated Mar. 4, 2021 in EP Application No. 16847427.8.
European Search Report dated Jul. 20, 2022 in Application No. EP20220164772.
IN Office Action dated Feb. 24, 2022 in Application No. IN202135037558.
Indian Office Action dated Feb. 26, 2021 in IN Application No. 201837011989.
International Preliminary Report on Patentability dated Mar. 3, 2022, in Application No. PCT/US2020/070427.
International Preliminary Report on Patentability dated Aug. 29, 2019 in PCT Application No. PCT/US2018/018241.
International Preliminary Report on Patentability dated Jun. 13, 2019 in PCT Application No. PCT/US2017/061054.
International Preliminary Report on Patentability dated Mar. 29, 2018 in PCT Application No. PCT/US2016/052211.
International Preliminary Report on Patentability dated Oct. 29, 2020 in PCT/US2019/019455.
International Search Report and Written Opinion (ISA/KR) dated Apr. 2, 2018 in PCT Application No. PCT/US2017/061054.
International Search Report and Written Opinion (ISA/KR) dated Dec. 16, 2016 in PCT Application No. PCT/US2016/052211.
International Search Report and Written Opinion (ISA/KR) dated Jun. 14, 2019 in PCT/US2019/019455.
International Search Report and Written Opinion (ISA/KR) dated May 23, 2018 in PCT Application No. PCT/US2018/018241.
KR Office Action dated Jul. 17, 2023, in Application No. KR10-2018-7009624 with English translation.
NASA Tech Brief "Automated Power-Distribution System,", US Department of Commerce, Springfield, VA, Feb. 1991, p. 128 (2 pp).
Taiwanese Office Action dated Apr. 27, 2021 in TW Application No. 109138208.
Taiwanese Office Action dated Mar. 23, 2020 in TW Application No. 105130239.
Taiwanese Office Action dated May 21, 2021 in TW Application No. 201833648.
TW Office Action dated Jan. 18, 2022, in Application No. TW110148618 with English translation.
TW office action dated Jan. 28, 2022, in Application No. TW107105853 with English Translation.
TW Office Action dated Jul. 7, 2023, in application No. TW112106324 with English translation.
TW Office Action dated Jul. 17, 2023, in application No. TW112106385 with English translation.
TW Office Action dated Jul. 28, 2022, in Application No. TW111124754 with English translation.
TW Office Action dated Nov. 25, 2021, in Application No. TW110141330 with English translation.
U.S. Notice of Allowance dated Sep. 8, 2022 in U.S. Appl. No. 16/946,140.
U.S. Corrected Notice of Allowance dated Apr. 28, 2022, in U.S. Appl. No. 15/733,765.
U.S. Corrected Notice of Allowance dated Aug. 5, 2024 in U.S. Appl. No. 18/310,443.
U.S. Corrected Notice of Allowance dated Dec. 21, 2022 in U.S. Appl. No. 16/946,140.
U.S. Corrected Notice of Allowance dated Feb. 28, 2022 in U.S. Appl. No. 16/486,113.
U.S. Non Final Office Action dated Mar. 21, 2024, in U.S. Appl. No. 17/634,150.
U.S. Non Final office action dated Mar. 30, 2022, in U.S. Appl. No. 16/946,140.
U.S. Non-Final office Action dated Nov. 14, 2022 in U.S. Appl. No. 17/804,802.
U.S. Non-Final Office Action dated Dec. 15, 2023 in U.S. Appl. No. 16/949,800.
U.S. Non-Final Office Action dated Dec. 28, 2023 in U.S. Appl. No. 18/310,443.
U.S. Non-Final Office Action dated Jul. 20, 2023, in U.S. Appl. No. 17/804,802.
US Non-Final Office action dated Oct. 4, 2021, in U.S. Appl. No. 16/946,140.
U.S. Non-Final Office Action dated Oct. 28, 2021 in U.S. Appl. No. 15/733,765.
U.S. Notice of Allowance dated Apr. 24, 2023 in U.S. Appl. No. 17/721,187.
US Notice of Allowance dated Apr. 26, 2019 for U.S. Appl. No. 15/365,685.
U.S. Notice of Allowance dated Apr. 6, 2022, in U.S. Appl. No. 15/733,765.
U.S. Notice of Allowance dated Feb. 1, 2023 in U.S. Appl. No. 17/721,187.
U.S. Notice of Allowance dated Feb. 5, 2024 in U.S. Appl. No. 18/131,682.
U.S. Notice of Allowance dated Feb. 11, 2022 in U.S. Appl. No. 16/486,113.
U.S. Notice of Allowance dated Feb. 14, 2024 in U.S. Appl. No. 18/131,682.
US Notice of Allowance dated Feb. 24, 2020 for U.S. Appl. No. 16/295,142.
US Notice of Allowance dated Jul. 29, 2020 for U.S. Appl. No. 16/439,376.
U.S Notice of Allowance dated Jun. 8, 2022 in U.S. Appl. No. 15/733,765.
U.S. Notice of Allowance dated Mar. 22, 2024 in U.S. Appl. No. 16/949,800.
U.S. Notice of Allowance dated May 1, 2024 in U.S. Appl. No. 18/310,443.
US Notice of Allowance dated Nov. 29, 2018 for U.S. Appl. No. 15/268,204.
US Office Action dated Apr. 6, 2018 for U.S. Appl. No. 15/268,204.

(56) References Cited

OTHER PUBLICATIONS

US Office Action dated Aug. 7, 2019 for U.S. Appl. No. 16/295,142.
US Office Action dated Mar. 16, 2020 for U.S. Appl. No. 16/439,376.
US Office Action dated Nov. 30, 2018 for U.S. Appl. No. 15/365,685.
U.S. Appl. No. 63/146,365, inventors Brown et al., filed Feb. 5, 2021.
U.S. Pat. Appl. No. PCT/US2021/017946, filed on Feb. 12, 2021.
U.S. Appl. No. 18/764,727, inventors Shrivastava D, et al., filed Jul. 5, 2024.
View Inc., Installation Description, Tintable Electrochromic Windows and an Associated Power Distribution Network, prior to Sep. 2014 (3 pages).
Vinci Construction Datasheet for "Horizon-Solar Connected Window", Dec. 2016 (2 pp).

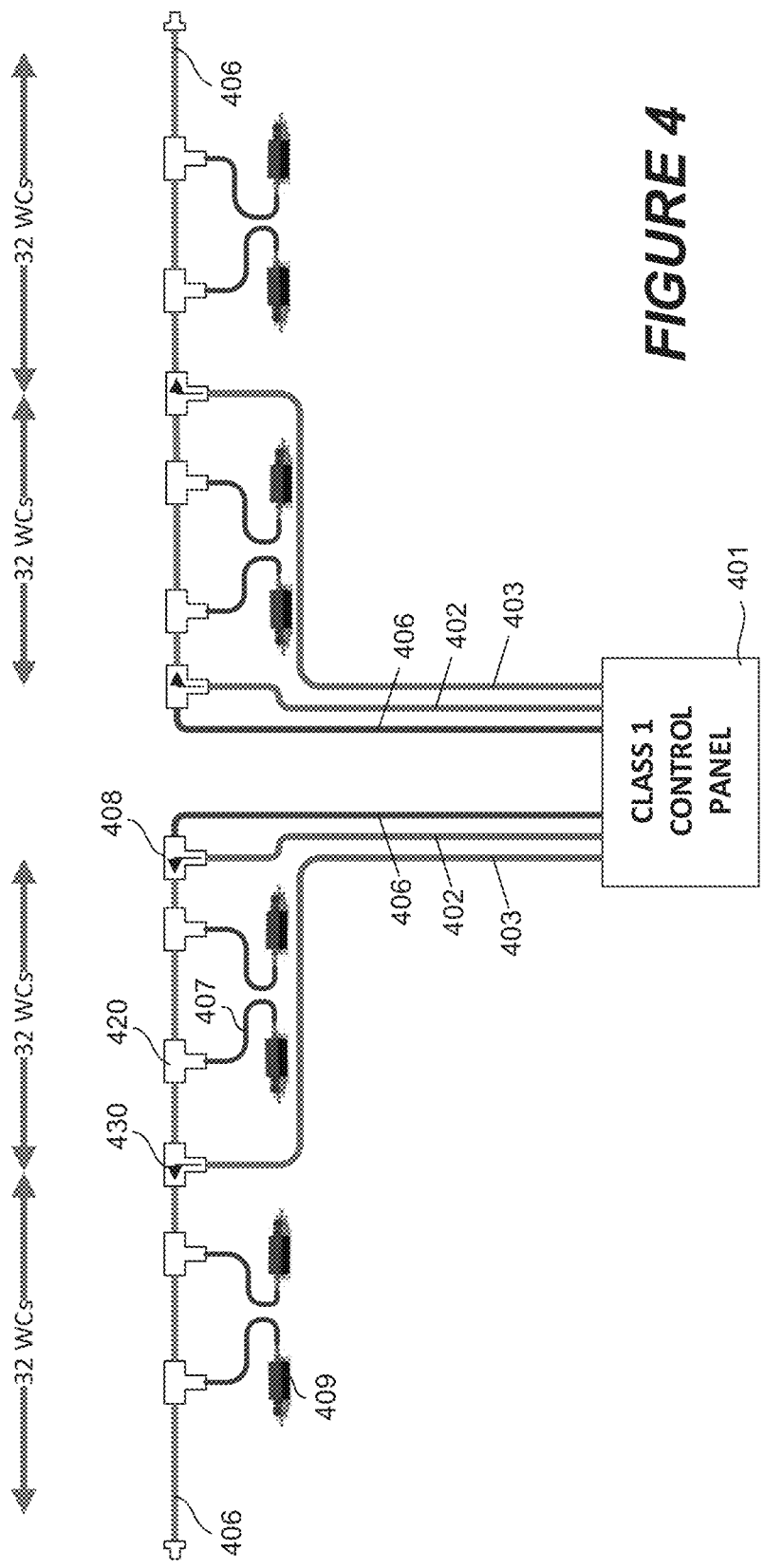

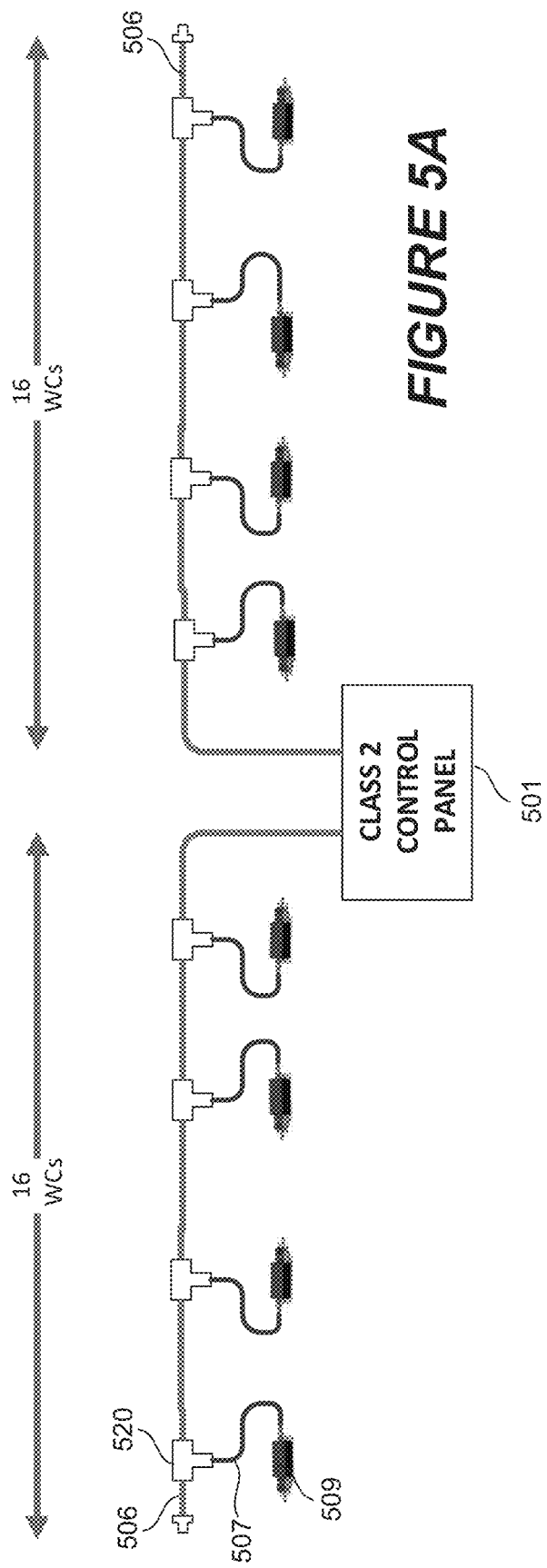

SOLAR POWER DYNAMIC GLASS FOR HEATING AND COOLING BUILDINGS

CROSS-REFERENCE TO RELATED APPLICATIONS

An Application Data Sheet is filed concurrently with this specification as part of the present application. Each application that the present application claims benefit of or priority to as identified in the concurrently filed Application Data Sheet is incorporated by reference herein in its entirety and for all purposes.

BACKGROUND

Electrochromism is a phenomenon in which a material exhibits a reversible electrochemically-mediated change in an optical property when placed in a different electronic state, typically by being subjected to a voltage change. The optical property is typically one or more of color, transmittance, absorbance, and reflectance.

Electrochromic materials may be incorporated into, for example, windows for home, commercial and other uses as thin film coatings on the window glass. The color, transmittance, absorbance, and/or reflectance of such windows may be changed by inducing a change in the electrochromic material, for example, electrochromic windows are windows that can be darkened or lightened electronically. A small voltage applied to an electrochromic device of the window will cause them to darken; reversing the voltage polarity causes them to lighten. This capability allows control of the amount of light that passes through the windows, and presents an opportunity for electrochromic windows to be used as energy-saving devices.

While electrochromism was discovered in the 1960's, electrochromic devices, and particularly electrochromic windows, still, unfortunately, suffer various problems and have not begun to realize their full commercial potential despite many recent advancements in electrochromic technology, apparatus and related methods of making and/or using electrochromic devices.

SUMMARY

One aspect of the present disclosure pertains to a system for providing power to a plurality of optically switchable windows in a building. The system includes: (a) a photovoltaic array having one or more photovoltaic panels to generate electric power; (b) a photovoltaic monitor coupled the photovoltaic array and configured to gather irradiance data from the photovoltaic panel(s); (c) an energy storage device; (d) a voltage regulator configured to receive electric power from the photovoltaic array, apply a charge signal to the energy storage device, and generate a DC output signal using power stored in the energy storage device and/or power from the photovolatic array; (e) a network configured to control the tint states of the tintable windows, where the network includes a master controller configured to issue instructions to one or more window controllers for controlling the tint states of the tintable windows where the instructions are based at least in part on the gathered irradiance data; and (f) one or more control panels configured to receive power from the DC output signal and provide power to one or more window controllers.

In some embodiments of the system includes a photovoltaic combiner coupled with the photovoltaic array and the voltage regulator, where the photovoltaic combiner is configured to minimize wiring to the voltage regulator.

In some embodiments, the master controller is configured to receive photopic data and/or directional lux data from one or more sensors, and the issued instructions are further based in part on the photopic data and/or the directional lux data. Sensors for providing the photopic data and/or directional lux data may be located in a separate building. In some cases, a sensor is a ring sensor. In some embodiments, the system is configured to utilize received directional lux data to reposition the photovoltaic panels of the photovoltaic array into a direction and orientation that approximately maximizes electric power generation.

Another aspect of the present disclosure pertains to a system for providing power to a plurality of optically switchable windows in a building. This system includes: (a) a photovoltaic array having one or more photovoltaic panels, where at least one of the photovoltaic panels is coupled with spandrel glass, and where the photovoltaic array is configured to generate electric power; (b) an energy storage device; (c) a voltage regulator configured to receive electric power from the photovoltaic array, apply a charge signal to the energy storage device, and generate a DC output signal using power stored in the energy storage device and/or power from the photovoltaic array; (d) one or more window controllers configured to control the tint states of the tintable windows; and (e) one or more control panels configured to receive power from the DC output signal and provide power to one or more window controllers.

In some embodiments of the system includes a photovoltaic combiner coupled with the photovoltaic array and the voltage regulator, where the photovoltaic combiner is configured to minimize wiring to the voltage regulator.

In some embodiments, the control panel(s) include a master controller configured to issue instructions to the window controller(s) for controlling the tint states of the tintable windows.

The master controller may be configured to receive photopic data and/or directional lux data from one or more sensors, and the issued instructions may be based at least in part on the photopic data and/or the directional lux data. Sensors for providing the photopic data and/or directional lux data may be located in a separate building. In some cases, a sensor is a ring sensor. In some embodiments, the system is configured to utilize received directional lux data to reposition the photovoltaic panels of the photovoltaic array into a direction and orientation that approximately maximizes electric power generation.

In some embodiments, the system includes a photovoltaic monitor coupled to the photovoltaic array which is configured to gather irradiance data and were the instructions based at least in part on the irradiance data.

The systems described herein in may include a photovoltaic array having at least two photovoltaic panels that are selective to different wavelengths of light. In some cases, differences in the selectivity of photovoltaic panels may be used to determine or estimate a full spectrum of solar irradiance received by the building. Differences in selectively may be a result of, e.g., differences in bandgap energies of the photovoltaic panels or use of an optical filter.

The systems described herein in may include, in some embodiments, a DC distribution panel configured to receive the DC output signal from the voltage regulator and distribute power to the control panel(s). The DC distribution panel may be further configured to deliver power to one or more non-electrochromic window systems. For example, a 24-volt direct current (DC) distribution grid may be used for delivering power to the control panel(s) and/or the non-electrochromic system(s).

The systems described herein in may include an inverter configured to interact with a power grid and convert the DC output signal to an alternating current (AC) output. In some cases, the system may include an AC distribution panel coupled to the inverter, the AC distribution panel configured to divide and distribute the AC output to one or more control panels that are configured to receive power from the AC distribution panel and convert AC power to DC power. In some cases, the interaction between the inverter and power grid includes the inverter feeding power back into the power grid and the power grid providing power to the inverter.

In some embodiments of systems described herein, the voltage regulator may be a pulse width modulation (PWM) controller or a maximum power point tracking (MPPT) controller. In some cases, the energy storage device includes one or more batteries configured for deep-cycle applications. A voltage regulator may be configured to prevent overcharging of the batteries(s). In some embodiments, there may be at least two batteries located in different areas of the building, and in some embodiments, a battery may be located at a control panel. In some embodiments, an energy storage device includes a capacitor or a supercapacitor. In some embodiments, one or more window controllers may have a local energy storage device.

Another aspect of the present disclosure pertains to a building façade for providing electric power. The façade includes: (a) a plurality of optically tintable windows; (b) a photovoltaic array including one or more photovoltaic panels, where the photovoltaic panel(s) are coupled to spandrel glass on the building's exterior, and where the photovoltaic array is configured to generate electric power; (c) an energy storage device; and a plurality of controllers configured to (i) charge the energy storage device using the generated electric power, (ii) control the tint states of the tintable windows using electric power provided from the energy storage device and/or the photovoltaic array, and (iii) provide power to one or more building systems and/or a municipal power grid using power provided from the energy storage device and/or the photovoltaic array.

Another aspect of the present disclosure pertains to a building. The building includes: (a) one or more optically tintable windows; (b) a photovoltaic array having one or more photovoltaic panels, where the photovoltaic panel(s) are coupled to spandrel glass on the building's exterior surface, and where the photovoltaic array is configured to generate electric power; (b) a photovoltaic combiner coupled with the photovoltaic array, the photovoltaic combiner configured to produce a first direct current (DC) signal by combining the generated electric power from the photovoltaic array; (c) an energy storage device; (d) a voltage regulator configured to receive electric power from the photovoltaic array, apply a charge signal to the energy storage device, and generate a DC output signal using power stored in the energy storage device and/or power from the photovoltaic array; (e) one or more window controllers configured to control the tint states of the tintable windows; and (f) one or more control panels configured to receive power from the DC output signal and provide power to the window controllers, wherein the control panel(s) are not configured to receive power from a municipal power grid.

In some embodiments, a building may also include a photovoltaic combiner coupled with the photovoltaic array and the voltage regulator, where the photovoltaic combiner is configured to minimize wiring to the voltage regulator.

Another aspect of the present disclosure pertains to a method controlling one or more optically switchable windows in a building. The method includes operations of (a) monitoring electric power generated by a photovoltaic array may of one or more photovoltaic panels; (b) determining irradiance data based on the power generated by the photovoltaic panel(s); and (c) issuing instructions to one or more window controllers for adjusting the optical state of the optically switchable window(s), the instructions based at least in part on the irradiance data.

In some cases, at least one of the photovoltaic panel(s) is coupled with spandrel glass on the exterior of the building.

In some cases, determining the irradiance data includes determining directional lux data based on the orientation of the photovoltaic panel(s).

In some cases, the method further includes receiving photopic data and/or directional lux data from one or more sensors. When this is the case, the issued instructions may be based at least in part on the received photopic data and/or the directional lux data.

In some cases, at least one sensor is a ring sensor, and in some cases, a sensor may be located at a different building.

The method may, in some cases, include an operation of repositioning the photovoltaic panels of the photovoltaic array into a direction and orientation that approximately maximizes electric power generation.

In some cases, adjusting the optical state of the optically switchable window(s) is performed using the power generated by the photovoltaic panel(s).

These and other features of the disclosed embodiments will be described more fully with reference to the associated drawings.

BRIEF DESCRIPTION OF THE DRAWINGS

FIG. 4 depicts a schematic view of one embodiment of a class 1 power distribution network that also acts as a communications network.

FIG. 5A depicts a schematic view of one embodiment of a class 2 power distribution network that may or may not also act as a communication network.

DETAILED DESCRIPTION

Switchable Window Technology

Typically, an "optically switchable device" is a thin film device that changes optical state in response to electrical input. The thin film device is generally supported by some sort of substrate, e.g., glass or other transparent material. The device reversibly cycles between two or more optical states. Switching between these states is controlled by applying predefined current and/or voltage to the device. The device typically includes two thin conductive sheets that straddle at least one optically active layer. The electrical input driving the change in optical state is applied to the thin conductive sheets. In certain implementations, the input is provided by bus bars in electrical communication with the conductive sheets.

While the disclosure emphasizes electrochromic devices as examples of optically switchable devices, the disclosure is not so limited. Examples of other types of optically switchable devices include certain electrophoretic devices, liquid crystal devices, and the like. Optically switchable devices may be provided on various optically switchable products, such as optically switchable windows. However, the embodiments disclosed herein are not limited to switchable windows. Examples of other types of optically switchable products include mirrors, displays, and the like. In the context of this disclosure, these products are typically provided in a non-pixelated format.

Figure 1:
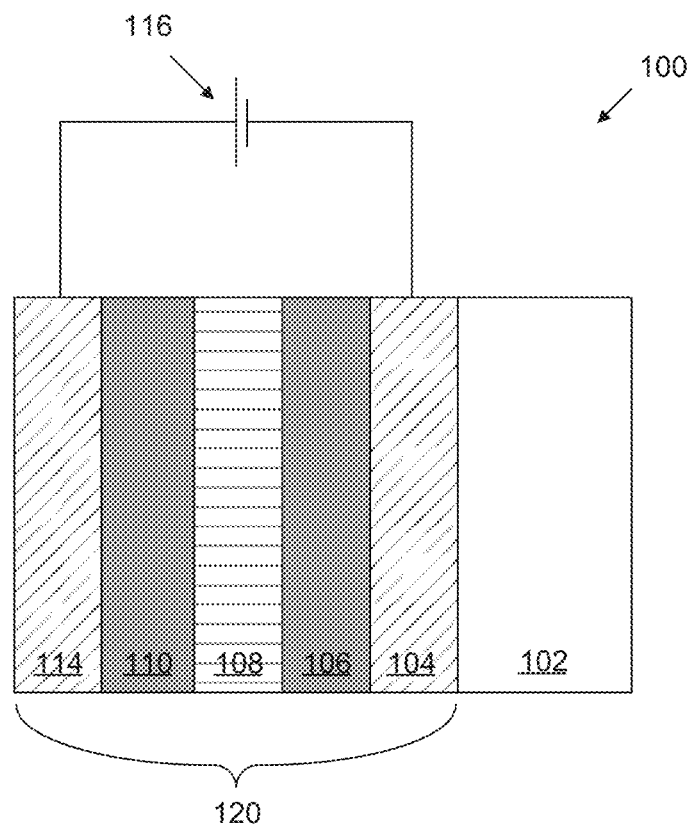
FIG. 1 illustrates a cross-sectional view of an electrochromic device according to certain embodiments.

A schematic cross-section of an electrochromic device 100 in accordance with some embodiments is shown in FIG. 1. The electrochromic device includes a substrate 102, a conductive layer (CL) 104, an electrochromic layer (EC) 106 (sometimes also referred to as a cathodically coloring layer or a cathodically tinting layer), an ion conducting layer or region (IC) 108, a counter electrode layer (CE) 110 (sometimes also referred to as an anodically coloring layer or anodically tinting layer), and a conductive layer (CL) 114. Elements 104, 106, 108, 110, and 114 are collectively referred to as an electrochromic stack 120. A voltage source 116 operable to apply an electric potential across the electrochromic stack 120 effects the transition of the electrochromic device from, e.g., a clear state to a tinted state. In other embodiments, the order of layers is reversed with respect to the substrate. That is, the layers are in the following order: substrate, conductive layer, counter electrode layer, ion conducting layer, electrochromic material layer, conductive layer.

In various embodiments, the ion conductor region 108 may form from a portion of the EC layer 106 and/or from a portion of the CE layer 110. In such embodiments, the electrochromic stack 120 may be deposited to include cathodically coloring electrochromic material (the EC layer) in direct physical contact with an anodically coloring counter electrode material (the CE layer). The ion conductor region 108 (sometimes referred to as an interfacial region, or as an ion conducting substantially electronically insulating layer or region) may then form where the EC layer 106 and the CE layer 110 meet, for example through heating and/or other processing steps. Electrochromic devices fabricated without depositing a distinct ion conductor material are further discussed in U.S. patent application Ser. No. 13/462,725, filed May 2, 2012, and titled "ELECTROCHROMIC DEVICES," which is herein incorporated by reference in its entirety.

In certain embodiments, the electrochromic device reversibly cycles between a clear state and a tinted state. In the clear state, a potential is applied to the electrochromic stack 120 such that available ions in the stack that can cause the electrochromic material 106 to be in the tinted state reside primarily in the counter electrode 110. When the potential applied to the electrochromic stack is reversed, the ions are transported across the ion conducting layer 108 to the electrochromic material 106 and cause the material to enter the tinted state.

It should be understood that the reference to a transition between a clear state and tinted state is non-limiting and suggests only one example, among many, of an electrochromic transition that may be implemented. Unless otherwise specified herein, whenever reference is made to a clear-tinted transition, the corresponding device or process encompasses other optical state transitions such as non-reflective-reflective, transparent-opaque, etc. Further, the terms "clear" and "bleached" refer to an optically neutral state, e.g., untinted, transparent or translucent. Still further, unless specified otherwise herein, the "color" or "tint" of an electrochromic transition is not limited to any particular wavelength or range of wavelengths. As understood by those of skill in the art, the choice of appropriate electrochromic and counter electrode materials governs the relevant optical transition.

In certain embodiments, all of the materials making up electrochromic stack 120 are inorganic, solid (i.e., in the solid state), or both inorganic and solid. Because organic materials tend to degrade over time, particularly when exposed to heat and UV light as tinted building windows are, inorganic materials offer the advantage of a reliable electrochromic stack that can function for extended periods of time. Materials in the solid state also offer the advantage of not having containment and leakage issues, as materials in the liquid state often do. It should be understood that any one or more of the layers in the stack may contain some amount of organic material, but in many implementations, one or more of the layers contains little or no organic matter. The same can be said for liquids that may be present in one or more layers in small amounts. It should also be understood that solid state material may be deposited or otherwise formed by processes employing liquid components such as certain processes employing sol-gels or chemical vapor deposition.

The electrochromic device may receive power in a number of ways. Wiring and other connectors for powering electrochromic devices are further discussed in U.S. patent application Ser. No. 14/363,769, filed Jun. 6, 2014, and titled "CONNECTORS FOR SMART WINDOWS," which is herein incorporated by reference in its entirety.

The electrochromic device is typically controlled by a window controller, which may be positioned locally on or near the electrochromic device/window that it powers. Window controllers are further discussed in the following Patents and Patent Applications, each of which is herein incorporated by reference in its entirety: U.S. patent application Ser. No. 13/049,756, filed Mar. 16, 2011, and titled "MULTIPURPOSE CONTROLLER FOR MULTISTATE WINDOWS"; U.S. Pat. No. 8,213,074, filed Mar. 16, 2011, and titled "ONBOARD CONTROLLER FOR MULTISTATE WINDOWS"; and P.C.T. Patent Application No. PCT/US15/29675, filed May 7, 2015, and titled "CONTROL METHOD FOR TINTABLE WINDOWS."

Photovoltaics as Power Sources

Photovoltaic ("PV") cells, or solar cells, convert solar energy into power. A PV panel, or module, is generally a collection of PV cells arranged such that the power output from each cell is collected and combined. A PV array is a collection of PV panels or modules arranged in formations such as, for example, series, parallel, or series/parallel. Conventional PV panels such as, for example, Grape Solar's® GS-P60-265-Fab2 or LG's NeON™ 2 LG320N1C-G4, typically produce between 240-350 W peak (for example, 36 V at 8 A DC) with 16-20% rated efficiency. Typically, PV arrays are placed atop structures such as, for example, rooftops of buildings, for maximum exposure to solar energy, but may also be located anywhere outside of a building, such as a west-facing facade, or even on the ground.

The power generated by PV cells is in the form of DC power. This PV-generated power may be used to power an electrochromic ("EC"), or optically switchable, window network installed in a building and is known as a PV-EC system. The size of a PV array installation will depend on the load requirements, for example, peak demands in watts, and may take into consideration, for example, battery storage requirements in kilowatts per hour. In some implementations, PV-EC systems are also designed to assume that, for example, the system will need one day of reserve power (an overcast day followed by a sunny day), and will thus require PV-power generation capabilities of double the daily power consumption of an EC window network and its associated power distribution network. Thus, for example, in a PV-EC system installation employing PV panels with 20% efficiency would need approximately one PV panel with dimensions of 1 m×2 m (or roughly 3 ft×6 ft) per 1250 $ft^2$ of EC glass window installed. With linear project scaling, this means that in a deployment involving 100,000 $ft^2$ of EC glass installation and 80 PV panels, the PV array will occupy about 1440 $ft^2$ of rooftop area (assuming a rooftop installation).

Communications Network

As described above, a network of electrochromic windows may be a power distribution network, a communication network, or both. Many of the embodiments herein focus on power distribution networks that may or may not also act as communication networks, and/or which may share certain components with a communication network. Where it is not specified how communication/control information is distributed, it is assumed that communication may occur through any available means. In some cases, this may mean that communication occurs over the same wires, conduits, tie-down anchors, and/or other components used by the power distribution network. In certain cases, communication may occur over some of the same wires/components as used by the power distribution network, with additional wiring provided for communication at particular places. In some cases, communication may occur wirelessly, alone or in combination with wired communication.

Figure 2:
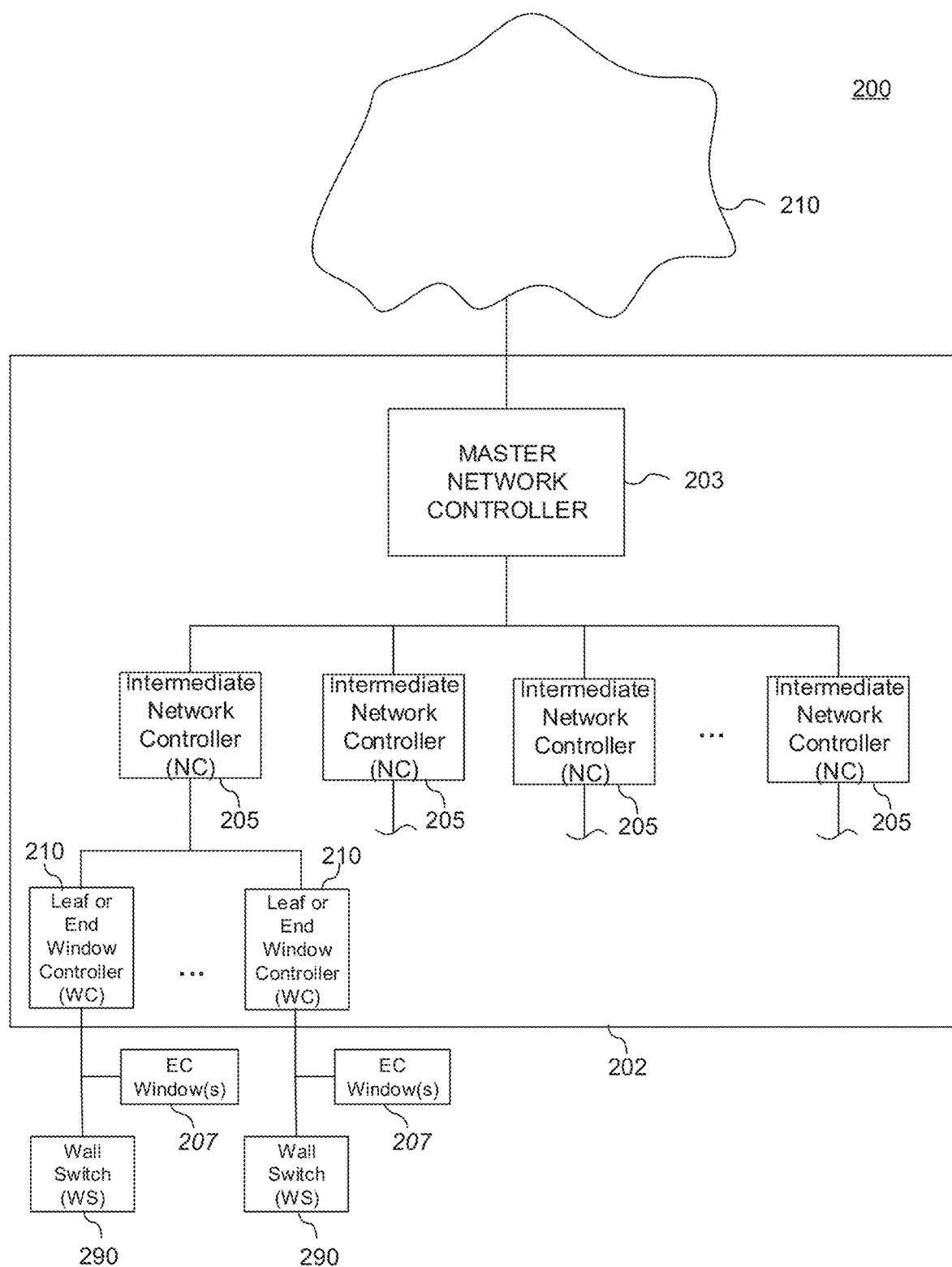
FIG. 2 presents a block diagram of components of a communications network for controlling functions of one or more tintable windows of a building.

FIG. 2 is a block diagram of components of a communications network system 200 for controlling functions (e.g., transitioning to different tint levels) of one or more tintable windows of a building, according to certain embodiments. As explained elsewhere herein, the communications network may be wholly or partially co-located with the power distribution network. System 200 may be one of the systems managed by a Building Management System (BMS) or may operate independently of a BMS.

System 200 includes a master window controller 202 that can send control signals to the tintable windows to control its functions. System 200 is described in terms of a master controller for example purposes. In other embodiments, the window control architecture may have the logic "heavy lifting" configured in a more distributed fashion, i.e., where window (leaf) controllers and/or network controllers share more of the computing burden. Examples of distributed control systems for controlling optically switchable windows are described in U.S. patent application Ser. No. 15/334,832, titled "CONTROLLERS FOR OPTICALLY-SWITCHABLE DEVICES", and filed Oct. 26, 2016; U.S. patent application Ser. No. 15/623,237, titled "MONITORING SITES CONTAINING SWITCHABLE OPTICAL DEVICES AND CONTROLLERS," and filed Jun. 14, 2017; and U.S. patent application Ser. No. 15/691,468, titled "MONITORING SITES CONTAINING SWITCHABLE OPTICAL DEVICES AND CONTROLLERS," and filed Aug. 30, 2017, both of which are incorporated in their entireties. System 200 also includes network components 210 in electronic communication with master window controller 202. The predictive control logic, other control logic and instructions for controlling functions of the tintable window(s), and/or sensor data may be communicated to the master window controller 202 through the network 210. Network 210 can be a wired or wireless network. In one embodiment, network 210 is in communication with a BMS to allow the BMS to send instructions for controlling the tintable window(s) through network 210 to the tintable window(s) in a building.

System 200 also includes electrochromic windows 207 and wall switches 290, which are both in electronic communication with master window controller 202. In this illustrated example, master window controller 202 can send control signals to EC window(s) 207 to control the tint level of the tintable windows 207. Each wall switch 290 is also in communication with EC window(s) 207 and master window controller 202. An end user (e.g., the occupant of a room having the tintable window) can use the wall switch 290 to control the tint level and other functions of the tintable electrochromic window (s) 207.

In FIG. 2, communications network 202 is depicted as a distributed network of window controllers including a master network controller 203, a plurality of intermediate network controllers 205 in communication with the master network controller 203, and multiple end or leaf window controllers 210. Each plurality of end or leaf window controllers 210 is in communication with a single intermediate network controller 205. Each of the window controllers in the distributed network of FIG. 2 may include a processor (e.g., microprocessor) and a computer-readable medium in electrical communication with the processor.

In FIG. 2, each leaf or end window controller 210 is in communication with EC window(s) 207 to control the tint level of that window. In the case of an IGU, the leaf or end window controller 210 may be in communication with EC windows 207 on multiple lites of the IGU control the tint level of the IGU. In other embodiments, each leaf or end window controller 210 may be in communication with a plurality of tintable windows. The leaf or end window controller 210 may be integrated into the tintable window or may be separate from the tintable window that it controls.

Each wall switch 290 can be operated by an end user (e.g., the occupant of the room) to control the tint level and other functions of the tintable window in communication with the wall switch 290. The end user can operate the wall switch 290 to communicate control signals to the EC window 207. In some cases, these signals from the wall switch 290 may override signals from master window controller 202. In other cases (e.g., high demand cases), control signals from the master window controller 202 may override the control signals from wall switch 290. Each wall switch 290 is also in communication with the leaf or end window controller 210 to send information about the control signals (e.g., time, date, tint level requested, etc.) sent from wall switch 290 back to master window controller 202. In some cases, wall switches 290 may be manually operated. In other cases, wall switches 290 may be wirelessly controlled by the end user using a remote device (e.g., cell phone, tablet, etc.) sending wireless communications with the control signals, for example, using infrared (IR), and/or radio frequency (RF) signals. In some cases, wall switches 290 may include a wireless protocol chip, such as Bluetooth, EnOcean, WiFi, Zigbee, and the like. Although wall switches 290 depicted in FIG. 2 are located on the wall(s), other embodiments of system 200 may have switches located elsewhere in the room.

Power Distribution Network

In a building that has a network of EC windows, or insulated glass units, installed but does not have PV-power generation capabilities, the network of EC windows may be powered by the main building power supply. Main building power distribution consists of various feeder and branch circuits, where some branch circuits are configured as 120 V single phase circuits that couple with control panels such as those by View, Inc. of Milpitas, California. Control panels, in turn, have the capabilities to power the EC window network with DC circuits meeting the requirements of the National Electric Code ("NEC") Article 725 class 1 power-limited circuits, which are generally limited to 30 V and 1000 V·A, or 24 V at 8 A or 196 W per power segment and class 2 inherently or not inherently limited circuits, which generally are limited to 30 V and 100 V.A. Typically Article 725 class 1 power limited or class 2 circuits are achieved with the use of a stepdown transformer or an AC to DC power supply. Control panels also house master controllers and network controllers capable of issuing and relaying tint commands to EC windows, so that the EC window network can function properly. EC window controllers may use class 1 or class 2 power, depending upon the installation specifics. Building power is supplied to a control panel from which power is further distributed to the EC window network.

In order to drive the EC window network, for example, an EC power supply network featuring a trunk line distribution scheme such as those commercially available from View, Inc. of Milpitas, California, power is supplied from the control panel through trunk lines. Connectors along the trunk line system may couple trunk lines with drop lines. Drop lines then couple with window controllers, which receive tinting instructions from the master controller as well as power from the same line. Power from the control panels being supplied through trunk lines, connectors, and drop lines to window controllers allow window controllers to direct one or more EC windows coupled with their respective window controller to tint to various tint states, depending on issued commands. The power supply distribution pathway of the control panel to its window controllers is collectively known as a power distribution network. Certain elements of power distribution networks will now be discussed.

Many topologies are possible for implementing a power distribution network to deliver power to a plurality of electrochromic windows. In various embodiments herein, a power distribution network can be characterized by at least two components: an upstream component and a downstream component. A single network can include multiple upstream components and/or multiple downstream components.

The upstream components include one or more primary power supplies (e.g., control panels) connected to the building's power supply and the components (e.g., cables) that are connected to the primary power supplies. The upstream components deliver power from the control panel or other power supply to the downstream components. The primary power supplies are essentially the most upstream components within the power distribution network. In many embodiments, the number of electrochromic windows is much higher than the number of cables used as upstream components. In other words, each upstream cable typically provides power to many electrochromic windows and window controllers. In some embodiments, an upstream cable provides power to 3 or more switchable windows. This topology represents a substantial improvement over network topologies where separate cables provide power to each individual window controller from the primary power supply. In such cases, the number of power insert lines is equal to the number of window controllers. These configurations present serious challenges related to the huge number, length, and volume of cables that need to be accommodated to supply power to all of the window controllers/windows. For example, the primary power supplies in such topologies must be designed to accept large numbers of cables, which can be challenging when many electrochromic windows are installed. Further, the labor involved in pulling such a large number/length/volume of cables throughout a building is extensive. For these reasons, power distribution networks that use fewer upstream cables to provide power to many electrochromic windows are advantageous.

Most of the downstream components receive power from the upstream components and deliver the power to the windows and window controllers. In many cases, the downstream components are arranged in a bus line, a daisy chain, or similar physical configuration or topology with directly connected window controllers. In some cases, the downstream components include drop lines, which deliver power (and in some cases communication information) directly to the window controllers. Typically, a drop line is an electrical connection between a bus line and an individual window controller. In addition to various power distribution cables (bus line, drop lines, daisy chain, etc.), the downstream components typically include electrical connectors. The electrical connectors may be power insert connectors, drop line connectors, or other types of connectors as described herein. Generally speaking, power insert connectors may be used to connect upstream power distribution cabling (e.g., power insert lines connected to a control panel) to downstream power distribution cabling (e.g., a bus line). Drop line connectors may be used to connect drop lines to a bus line. The window controllers may be connected in series in some implementations and in a daisy chain formation in some other implementations. The downstream components can be characterized as including distinct segments in some embodiments, as discussed further with respect to FIG. 3C, below. The cabling used for the upstream components may be the same or different from the cabling used for the downstream components. In some embodiments, one or more supplemental power panels or energy wells may be provided as downstream components. In some cases, supplemental power panels may receive power from a main building supply, and may provide power to a bus line via a supplemental power insert line. Typically, a supplemental power panel will deliver power to the bus line at a position that is more downstream than the position at which a primary power supply delivers power to the bus lines, as explained further below.

Figure 3A:
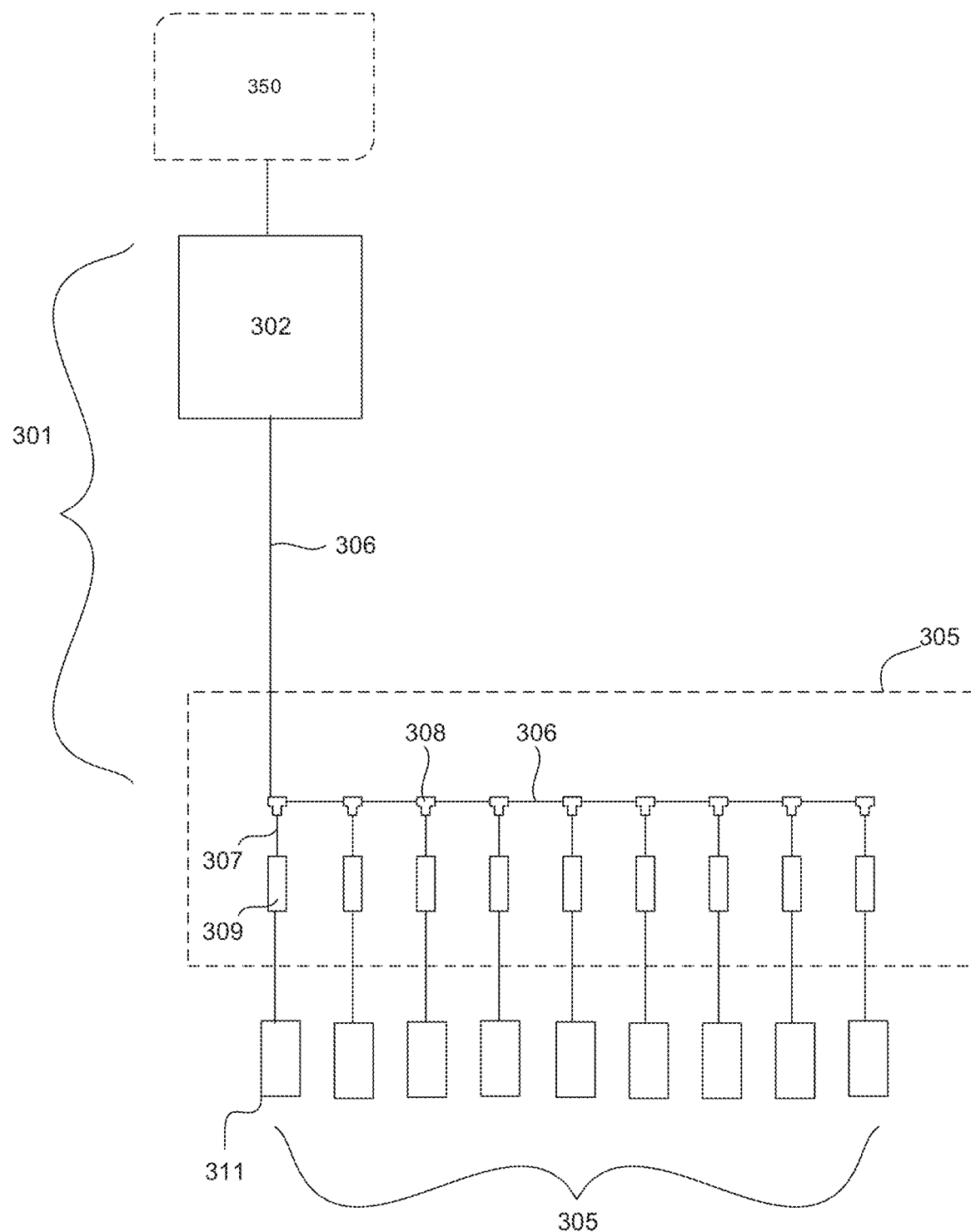
FIGS. 3A, 3B, and 3C illustrate upstream and downstream components in different embodiments of a power distribution network.

In certain implementations, at least a portion of the downstream and/or upstream cabling may be provided in a trunk line. Briefly, a trunk line is defined by a structural element and a positional element. Structurally, a trunk line is understood to include wires for carrying power. In many cases, a trunk line also includes wires for carrying communication information, though this is not always the case. With respect to position, a trunk line is understood to be functionally positioned between the control panel and the individual drop lines (or the window controllers themselves if no drop lines are present). Drop lines can tap off of the trunk line to receive power and communication information. Drop lines are not considered to be part of the trunk line. In certain implementations, a trunk line may be a 5 wire cable (including one pair of wires for power, one pair of wires for communication, and one ground wire). Similarly, the drop lines may also be 5 wire cable. In some other implementations, the trunk line and/or drop lines may be 4 wire cable (including one pair of wires for power and one pair of wires for communication, without any separate ground wire). The trunk line may carry class 1 or class 2 power in various embodiments. In some particular embodiments, at least a portion of the downstream cabling (and optionally the upstream cabling) may be flat wire cabling. Where flat wire cabling is used, the drop line connectors may be insulation displacement connectors, which are also discussed further below. Flat wire cabling enables wiring systems having more flexibility in tight spaces, as well as some benefits with cable handling and connectivity. Cabling, connectors, and circuitry for power distribution networks are further discussed in U.S. patent application Ser. No. 15/365,685, titled "POWER DISTRIBUTION NETWORKS FOR ELECTROCHROMIC DEVICES," filed Nov. 30, 2016, which is hereby incorporated by reference in its entirety FIG. 3A presents a simplified view of a power distribution network for delivering power to a plurality of electrochromic windows. The following description focuses on the aspects of a power distribution network originating at a control panel 302. Control panel 302 receives AC or DC electric power from a source 350. Source 350 may be, e.g., a building's main power supply that is connected to the electric grid, an off-the-grid ("OTG") system that uses solar power generated on site, or a hybrid-solar system that can provide solar power generated on-site and power through the grid. Examples of systems and power networks that may embody source 350 are described elsewhere herein (e.g., see FIGS. 6-8). Returning to FIG. 3A, the upstream components 301 include the control panel 302 and trunk line 306. The downstream components 305 in FIG. 3A include the trunk line 306, drop lines 307, and connectors 308 between the trunk line 306 and drop lines 307.

The trunk line 306 may be a single continuous cable, or it may be several distinct cables that join one another at the connectors 308. In this example, the trunk line 306 is a linear bus, with drop lines 307 that connect each window controller 309 to the trunk line 306. Each window controller 309 controls one or more windows 311. So, the topology depicted in FIG. 3A is often just one portion the power distribution network fed by a single control panel. Similar extensions are possible in the topologies depicted in FIGS. 3B and 3C.

Figure 3B:
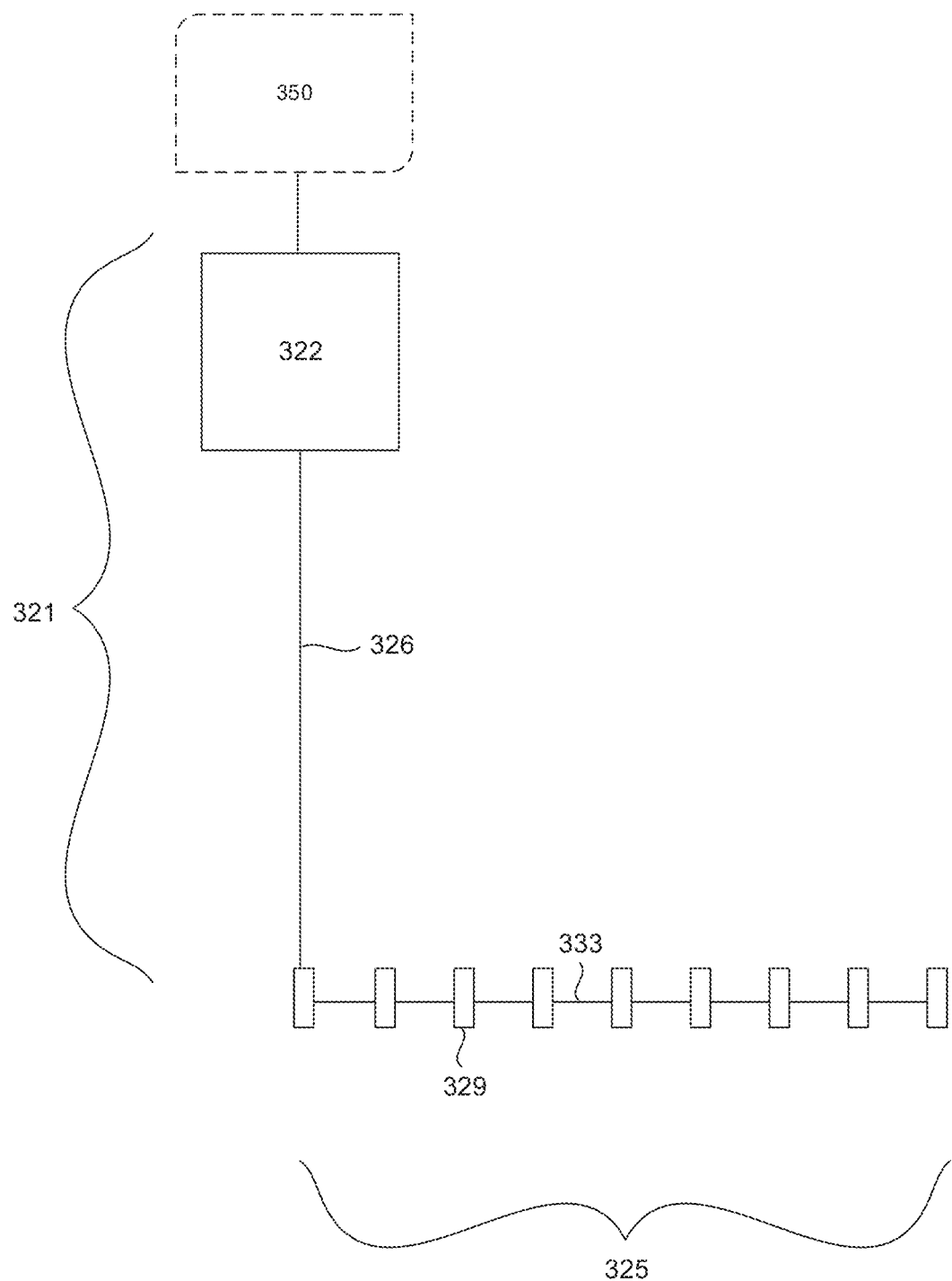

FIG. 3B presents a simplified view of another power distribution network. In this example, the window controllers are connected in series. This configuration is sometimes referred to as a daisy chain. Here, the upstream components 321 include the control panel 322 and the trunk line 326. The downstream components 325 include at least the intermediate cabling 333 that connects the window controllers 329 and/or electrochromic windows with one another. For clarity, the windows are not shown. They are connected to the window controllers.

Figure 3C:
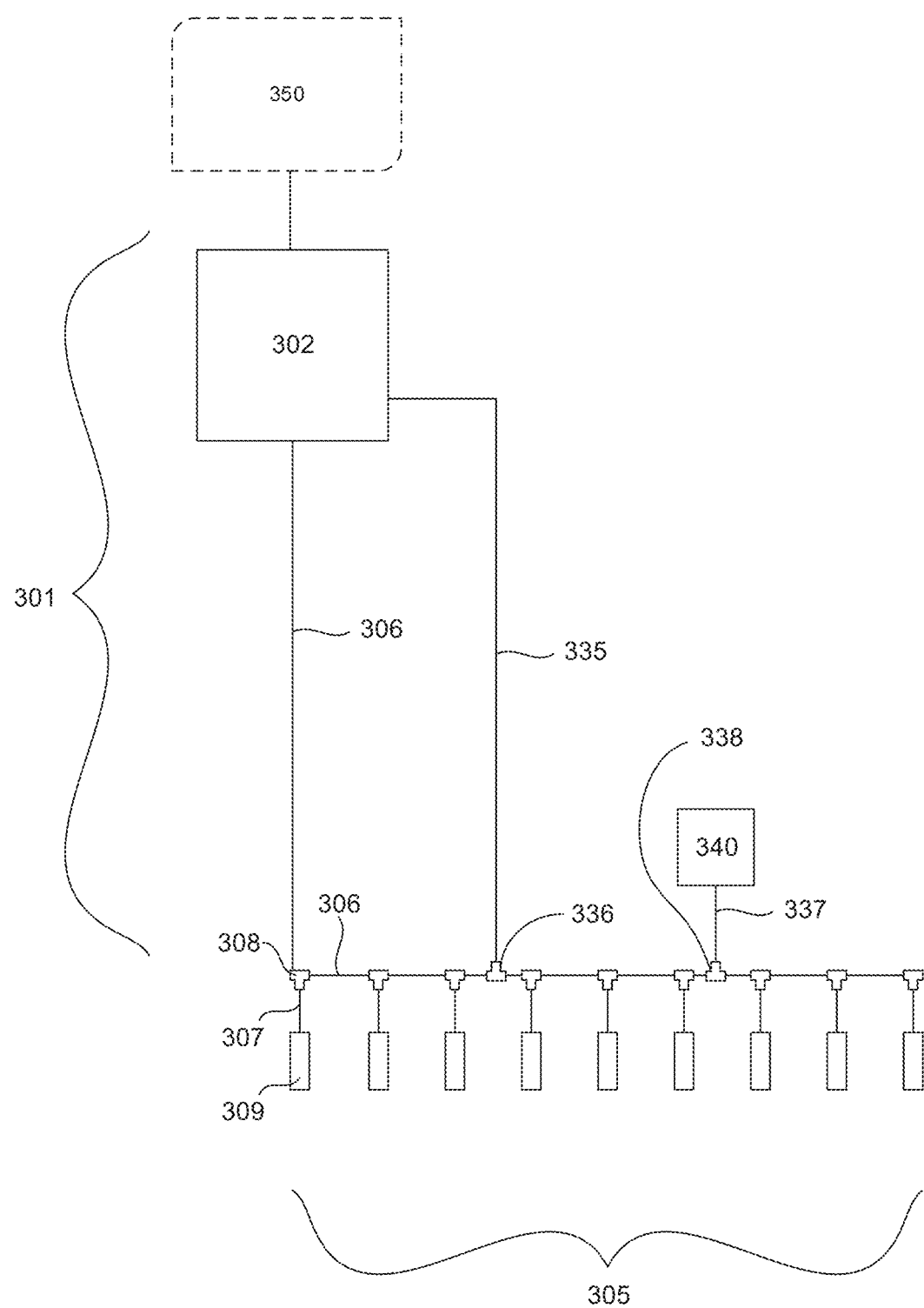

FIG. 3C illustrates an additional example of a power distribution network similar to the one shown in FIG. 3A. For the sake of brevity, only the differences will be discussed. In this example, the control panel 302 is connected to the trunk line 306 and power insert line 335. Power insert line 335 may be referred to as a secondary power insert line. The secondary power insert line 335 connects with the trunk line 306 at a more downstream position on the trunk line 306. Each trunk line 306 can have one or more secondary power insert lines 335. The secondary power insert line 335 may be provided to ensure that sufficient power is delivered from the trunk line 306 to power all of the window controllers 309 and electrochromic windows (not shown) as needed. For example, limitations on current/voltage, as well as line losses, can limit the number of window controllers/windows that can be powered by an individual power insert line. To address this limitation, the control panel 302 may be connected with the trunk line 306 using a plurality of power insert lines. The maximum number of secondary power insert lines 335 connected to an individual control panel 302 may be limited by the available power output of the control panel 302. The secondary power insert line 335 and supplemental power insert line 337 (discussed further below) typically are not considered to be part of the trunk line 306.

The points at which a power insert line 335 or 337 meets the trunk line 306 may be referred to as a power insert points or power insert connectors 336 and 338. These power insert points can be understood to divide the downstream components 305 into multiple segments. In general terms, a segment refers to a group of window controllers connected contiguously to a section of the network (e.g., to a span of the trunk line between adjacent power insert points), and the associated section of the network. In FIG. 3C, three segments are shown, with a first segment being defined between the point at which the control panel 302 meets the trunk line 306 and the point at which the secondary power insert line 335 meets the trunk line 306 at power insert point 336, the second segment being defined between the point at which the secondary power insert line 335 meets the trunk line 306 at power insert point 336 and the point at which the supplemental power insert line 337 meets the trunk line 306 at power insert point 338, and the third segment being defined between the point at which the supplemental power insert line 337 meets the trunk line 306 at power insert point 338 and the end of the trunk line 306. In this example, each segment of the downstream components 305 includes three connectors 308, three drop lines 307, three window controllers 309, and three electrochromic windows (not shown).

While FIG. 3C shows only three electrochromic window controllers per segment of the downstream components, the number of window controllers/windows between adjacent power insert points may be much higher. In some cases, the number of window controllers and electrochromic windows positioned on each segment of the downstream components may be between about 10-20, or between about 20-30, or between about 30-40. In certain cases where the power distribution network is implemented as a class 1 power-limited circuit, up to about 98 window controllers/windows may be installed between adjacent power insert points. In certain cases where the power distribution network is implemented as a class 2 circuit, up to about 48 window controllers/windows may be installed between adjacent power insert points. The number of window controllers/windows that can be adequately powered on each segment depends on a number of factors including (i) the current or power drawn by each window controller, (ii) the current or power delivered by the upstream component cables (power insert lines), (iii) the length of the cables between adjacent window controllers and (iv) the number of windows that each controller can accommodate. For example, a window controller may control between one and about twenty windows, or up to about fifteen windows, or up to about ten windows, or up to about five windows.

With respect to the current or power drawn by each window controller, relatively more window controllers/windows can be accommodated on each segment of the downstream components when the window controllers/windows draw relatively less power. In certain examples, the window controllers each draw about 2 Watts or less. With respect to the current or power delivered by the upstream component cables/power insert lines, upstream cables that provide more current/power can be used to accommodate relatively more window controllers/windows per segment of the downstream components. For example, where the upstream components deliver class 1 rated power (as opposed to class 2 power), relatively more window controllers/windows can be positioned on each segment of the downstream components. With respect to the length of the cables between adjacent window controllers, longer lengths may result in higher line losses, thereby resulting in fewer window controllers/windows that can be accommodated on each segment.

Another difference between the power distribution network shown in FIG. 3C and the one shown in FIG. 3A is that the network in FIG. 3C includes a supplemental power panel 340, sometimes referred to as a remote power panel. Like control panel 302, supplemental power panel 340 may receive AC or DC electric power from the grid, an on-site PV system, or a hybrid-solar system that can provide solar power generated on-site and/or power through the grid. While not depicted, in some embodiments, supplemental power panel 340 and control panel 302 are configured to receive power from the same source 350. In some embodiments, source 350 may include an uninterruptible power supply ("UPS") as described elsewhere herein. In some embodiments, supplemental power panel 340 is not directly connected to a power source, but includes and energy well (e.g., a battery) that stores excess power which can then be used during a period of high power demand. The supplemental power panel 340 provides power to the trunk line 306 through a supplemental power insert line 337 Like the control panel 302, the supplemental power panel 340 may include circuitry or other protections to ensure that power is provided to the trunk line 306 at an appropriate voltage, current, etc. One difference between the supplemental power panel and the control panel in various cases is that the supplemental power panel acts merely as a source of power, whereas the control panel may have additional components that serve various communication and control functions for controlling optical transitions on the electrochromic windows. Another difference is that the supplemental power panel 340 may be positioned at a location remote from the control panel 302. Often, the distance between the supplemental power panel 340 and the set of windows it powers is shorter than the distance between the control panel 302 and this same set of windows. This may help minimize the length of the supplemental power insert line 337, thereby minimizing line losses. Both the supplemental power panel 340 and the supplemental power insert line 337 may be considered to be part of the downstream components 301.

The secondary power insert line 335 and supplemental power insert line 337 each provide power to the trunk line 306, and can collectively be referred to as the power insert lines. The number of power insert lines used is largely affected by the number of electrochromic windows present on the power distribution network. Factors affecting the number of window controllers/windows that can be installed between adjacent power insert points are discussed further above.

Because the window controllers are generally provided proximate or near to the optically switchable windows, in the downstream portion of the topology, relatively few cables need to originate from the control panel. Fewer than one cable per window emanates from the control panel. As a consequence, less labor and infrastructure is required for installation. For example, fewer J-hooks are required to support the weight of the cables between the control panel and the downstream portion of the topology.

Figure 5B:
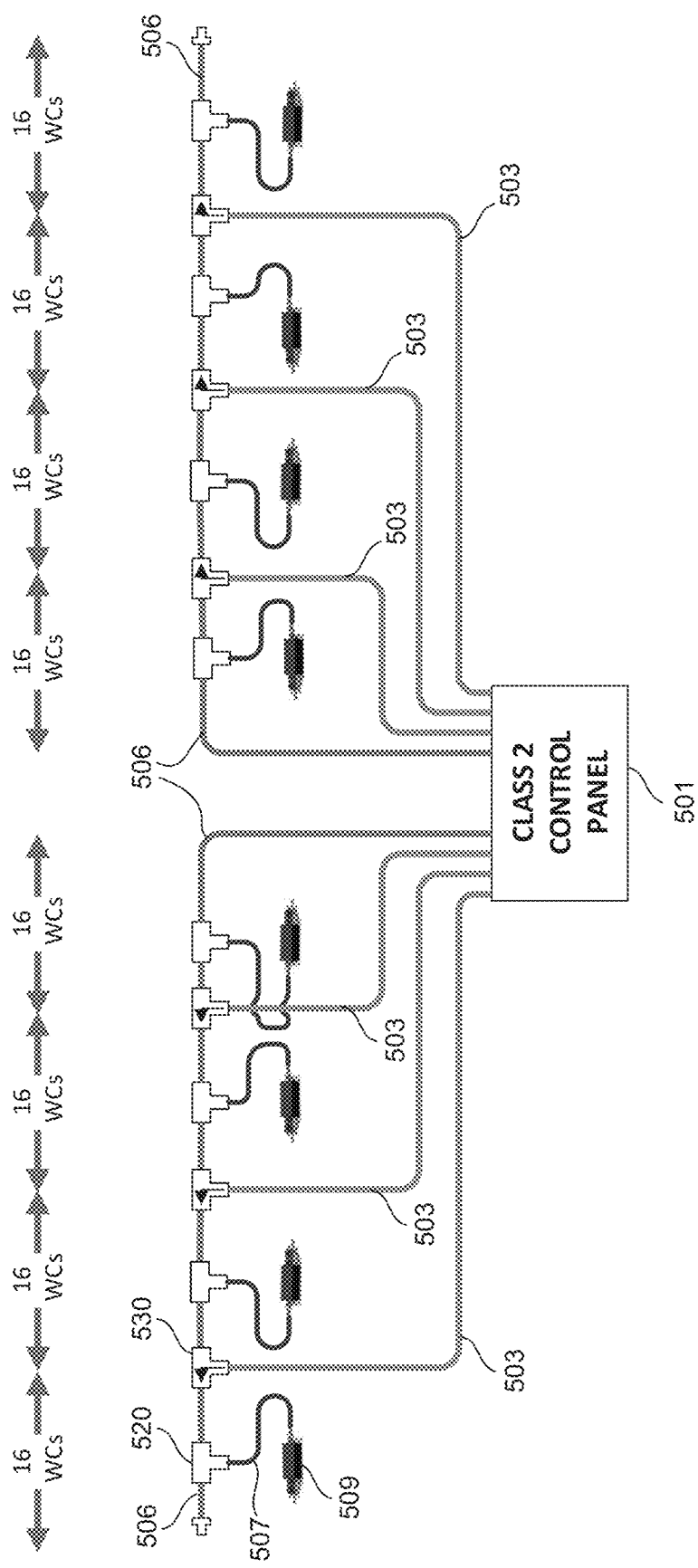
FIG. 5B depicts a schematic view of another embodiment of a class 2 power distribution network utilizing a number of secondary power insert lines.

While the embodiments of FIGS. 3A-3C show only a single control panel and a single trunk line, the embodiments are not so limited. In some related implementations, a single control panel may be connected with multiple trunk lines, for example, as shown in FIGS. 4, 5A, and 5B, discussed further below. In some such cases, the upstream cabling components may be run in parallel with one another for at least a portion of the distance between the control panel to the downstream components. In various embodiments, separate data communication lines may also traverse the distance from the control panel to the downstream components, though this is not essential. In these or other implementations, multiple control panels may be provided within a building, and each control panel may be connected with the primary building power. The control panels may be located together in a single location or dispersed throughout a building. Similarly, supplemental power panels can be provided throughout a building as desired. In some embodiments, a power distribution network may include a single control panel and any number of supplemental power panels.

FIG. 4 presents an example of a combined power distribution network and communications network. In this example, the power distribution network is implemented as a class 1 power-limited circuit. A class 1 control panel 401 is connected to 6 individual cables 402, 403, and 406. Cables 402 are primary power insert cables, cables 403 are secondary power insert cables, and cables 406 are trunk lines with either no power connection, or power-limited to Class 2 levels. In this example, the primary power insert cables 402 provide power to the initial group of window controllers located between the where the primary power insert cables 402 and secondary power insert cables 403 connect with the trunk line 406. The primary power insert cables 402 connect with the trunk lines 406 at power/communication integration connectors 408. In this example, the network includes two trunk lines 406, which are analogous to the trunk line 306 in FIG. 3A, for example. The trunk lines 406 may be rated at about 8 A or less. Drop lines 407 connect with the trunk lines 406 at drop line connectors 420, thereby providing power and control information to the individual window controllers 409. The secondary power insert cables 403 connect with the trunk lines 406 at power insert connectors 430. The primary and secondary power insert cables 402 and 403 carrying class 1 power may each be a particular length, for example up to about 200 feet or up to about 350 feet. Power insert cables longer than this length may result in substantial line losses in certain cases. For the sake of clarity, only a single drop line 407, window controller 409, power/communication integration connector 408, drop line connector 420, and power insert connector 430 are labeled in FIG. 4.

Though not shown in the figures, it is understood that each of the window controllers 409 is connected with at least one electrochromic window. Further, while FIG. 4 only shows two window controllers 409 per segment of the trunk lines 406 (the segments being defined between adjacent power insert points or power insert connectors), many additional window controllers/windows may be provided in each segment. In certain implementations, for instance, the number of window controllers/windows per segment on a class 1 power distribution network may be at least about 10, at least about 20, or at least about 30. In various cases, a class 1 power distribution network may have up to about 96 window controllers, each controlling one or more windows, on each segment of the trunk line, as suggested in FIG. 4.

Special considerations should be taken into account to ensure safe operation of the class 1 power distribution network. For instance, the various power insert lines, trunk lines, and/or drop lines carrying class 1 power may be provided in conduit or metal raceway, and/or they may be provided as class 1 rated cable. In some cases, different portions of the power distribution network satisfy the class 1 safety measures in different ways, for example, one portion of the network may use class 1 rated cable while another portion of the network may use conduit or raceway to protect non-class 1 rated cable. In certain implementations, the power insert lines and/or trunk lines in a class 1 power distribution network may be rated at about 15 A and 600 V. In some cases, the power insert lines and/or trunk lines may be rated as TC-ER (tray cable-exposed run). A power-limited tray cable (PLTC) may be used for the power insert lines and/or trunk lines in certain cases.

Power distribution networks implemented as class 1 power-limited circuits can be beneficial for various reasons. For instance, class 1 power-limited circuits can be used to minimize the overall length of wiring that should be installed to provide sufficient power to all of the windows on the network. Although power distribution networks implemented as class 1 power-limited circuits should meet the safety qualifications set out in the NEC (e.g., for cables carrying class 1 power, the use of class 1 rated cable, or the use of conduit or raceway to run non-class 1 rated cable), these qualifications may be particularly easy to meet in some embodiments. For example, where a set of electrochromic windows is provided in a curtain wall, with adjacent windows being separated by hollow mullions and/or transoms, such mullions/transoms can provide the raceway or conduit in which non-class 1 rated cable can be safely run. In other words, the curtain wall infrastructure itself can be used to provide the safety standards set out in the NEC, at least with respect to the cables that run within the curtain wall infrastructure. Mullions and transoms are often aluminum, though this is not required. Other materials and hollow structures used to frame adjacent windows may be used in this same way. With respect to cables that are not positioned within the curtain wall infrastructure (e.g., upstream cables such as power insert cables, portions of a trunk line not within the curtain wall, etc.), other class 1 protections such as conduit, raceway, or class 1 rated cable may be used.

In one example, the trunk line 406 may carry class 1 power-limited circuits without being rated as a class 1 cable because it enclosed in a metal raceway. The trunk line 406 can safely carry class 1 power on non-class 1 rated cable by running the trunk line 406 through the metal mullions/transoms that form the curtain wall. In such embodiments, the power insert lines 402 and 403 may be rated as class 1 power-limited circuits (in which case no additional safety measures are needed), or they may be rated as non-class 1 (in which case the power insert lines may be run through conduit or metal raceway to ensure safe operation). The existence of a curtain wall or similar structure where adjacent windows are separated by hollow structures makes the use of a class 1 power distribution network particularly beneficial, since non-class 1 rated cable can be easily and safely used to carry class 1 power. Class 1 rated cable is more expensive, larger, and therefore more challenging to install than similar non-class 1 rated cable.

It should be noted that where trunk line 406 may serve as a dedicated communication line and is provided separate from the power insert lines 402 and 403 (such that the trunk line 406 does not carry power), the trunk line 406 does not need to be provided with particular safety measures. In other words, trunk lines 406 do not need to be class 1 rated cable, nor do they need to be provided in conduit or metal raceway.

In another example where the electrochromic windows are installed in a set of punched openings (rather than together in a curtain wall), class 1 rated cable may be used for the power insert lines 402 and 403. In another embodiment, any of the power insert lines 402 and 403 and the trunk lines 406 may be non-class 1 rated cable provided in an appropriate conduit or raceway. In a particular example, the trunk line 406 may be non-class 1 rated cable, but is provided in conduit or raceway between adjacent window controllers for windows installed in adjacent punched openings.

FIG. 5A presents an embodiment of a power distribution network that may also act as a communication network. Here, the power distribution network is implemented as a class 2 circuit. A class 2 control panel 501 is connected to two trunk lines 506. No separate communication lines are shown, and control information may either be carried over the trunk lines 506, over a separate communications network (not shown) or wirelessly. The window controllers 509 connect with the trunk lines 506 via drop lines 507. The drop lines 507 connect with the trunk lines 506 at drop line connectors 520. The trunk lines 506 may be class 2 rated cables. In some cases, the trunk lines 506 may be rated at about 4 A or less. Due to the class 2 nature of the power distribution network in FIG. 5A, the number of window controllers that can be installed on each segment of the trunk line 506 is more limited than if the network were class 1. If the number of window controllers/windows exceeds the power that can be provided by the trunk lines 506 themselves, additional power insert lines may be provided, as shown in FIG. 5B. In this example, up to about 32 window controllers, each controlling one or more windows, may be installed on each trunk line.

FIG. 5B presents an additional embodiment of a power distribution network that may also act as a communication network. In this example, the network is implemented as a class 2 circuit. A class 2 control panel 501 is connected to 8 individual cables including two trunk lines 506 and six secondary power insert lines 503. Here, the trunk lines 506 extend all the way to the control panel 501, and no separate communication line or primary power insert line is provided. Communication information may be transferred over the trunk lines 506, or through wireless means, or through a separate communication network (not shown). As such, there is no need for a power/communication integration connector such as the connector 408 in FIG. 4. In a similar embodiment, separate primary power insert cables and communication cables may be provided to bring power and communication information to the trunk lines, as shown in FIG. 4. Drop lines 507 connect the window controllers 509 to the trunk lines 506 at the drop line connectors 520. The secondary power insert lines 503 connect with the trunk lines 506 at power insert connectors 530.

Because the power distribution network in FIG. 4 is implemented as a class 2 circuit, fewer window controllers/windows can be powered by each segment of the network, as compared to a similar power distribution network implemented as a class 1 power-limited circuit. While FIG. 5B shows only a single window controller 509 on each segment (the segments being defined between adjacent power insert points, or between a power insert point and the end of the trunk line 506), many additional windows may be provided per segment in various cases. In some examples, a class 2 power distribution network may have at least about 10 or at least about 15 window controllers and associated electrochromic windows per segment. In certain implementations, up to about 32 window controllers (WCs), each controlling one or more associated optically switchable windows, may be installed per segment of the network, as suggested in FIG. 5B.

Although the number of windows per segment may be limited, the class 2 power distribution network may be advantageous for other reasons. For example, because the network is implemented as a class 2 circuit, none of the cabling needs to meet the safety requirements of a class 1 power-limited circuit. In other words, the cables can be non-class 1 rated cable, and can be run without the use of conduit or metal raceway. Such class 2 power distribution networks may be particularly useful in contexts where windows are installed in a punched opening construction (as compared to a curtain wall, for example). In a typical punched opening construction, individual windows (or small sets of windows in some cases) are installed in individual openings in the building's construction. Adjacent windows (or small sets of windows) are generally separated by concrete or other materials that make up the building itself. In other words, the building construction includes a large number of separate openings into which windows (or sets of windows) are installed. By contrast, with a curtain wall, many windows are installed together in a large opening in the building's construction. Adjacent windows are separated by a framing system of mullions and/or transoms, depending on the layout of the windows. While the mullions/transoms can be used to provide class 1 safety measures (e.g., the mullions/transoms providing the metal raceway in which non-class 1 rated wire can be run while safely carrying class 1 power, as described above in relation to FIG. 4) for implementing a class 1 power distribution network, no such convenient framing system is typically present between adjacent punched openings in a building. Therefore, in certain embodiments where a number of electrochromic windows are installed in several individual punched openings, it may be advantageous to implement the power distribution network as a class 2 circuit.

In some embodiments, the secondary power insert lines 503 and the trunk lines 506 may be rated at about 4 A or less. In some embodiments, power insert lines carrying class 2 power may be limited to a particular length, for example, no more than about 350 feet.

Any of the power distribution networks described herein can further include one or more supplemental power panels and supplemental power insert lines, as shown in relation to FIG. 3C. Such features can be incorporated into both class 1 and class 2 power distribution networks.

Further, any of the power distribution networks described herein can further include one or more local power storage units. Uninterruptible power supplies ("UPSs") or energy wells may be stored at various locations on a power distribution network. In some cases, UPSs are included in a system that delivers power to one or more control panels (e.g., battery bank 605 in FIG. 6). In some cases, energy wells are placed at a control panel, a supplemental control panel, along a trunk line, along a drop line, or at window controllers. The energy wells can provide power to drive optical transitions on one or more windows. The energy wells effectively increase the peak power available for delivery by the system because energy can be delivered from both the control panel(s) and the energy well(s) simultaneously. The energy wells can be recharged when there is excess power available on the network (e.g., when the windows are not changing tint states such as night or when the power being used to drive the windows is less than the power that can be delivered by the control panel or other power supply). Analogously, with energy wells in the power distribution network, less total power is required for the incoming power to the system, because of the augmented power supply from the energy wells. Thus, wiring for the distribution network may be less or of smaller gauge and/or power requirements and/or have less duplication or redundancy that otherwise might be necessary.

In some cases, energy wells may be used to increase the number of electrochromic windows that can be positioned on each segment of the downstream components. For example, a trunk line having 20 windows installed on a single segment may not be able to simultaneously power transitions on all 20 windows. While it is relatively rare for a network to transition all windows simultaneously, the network should be designed to handle such an event. When a command is received to transition all 20 windows, much of the power may be provided by a control panel and/or supplemental power panel. If the control panel/supplemental power panel can only provide enough power to drive transitions on 15 windows, the power needed to transition the remaining 5 windows may be provided by one or more energy wells. The energy wells can discharge to provide power as needed, and then can recharge via the power distribution network when the power demanded by the window controllers/windows decreases.

In conventional electrochromic window networks, power input into the network closely corresponds in time and magnitude with power delivered by the network. The power input into the network refers to the power drawn by the network from a main power source (e.g., via control panel(s) or other source(s) within the facility). The power delivered by the network refers to the power provided to the individual windows/window controllers (and any related components) to drive optical transitions on the windows. In conventional electrochromic window networks, these are largely the same (except for losses occurring due to, e.g., line loss). As such, the maximum power that can be delivered to the windows is limited by the maximum power that can be input into the system from the power source. However, the use of energy wells allows for these power transfers to be decoupled to some extent. In this way, the maximum power delivered to the windows can exceed the maximum power input into the system. Therefore, networks that utilize energy storage wells can achieve a higher peak delivered power than similar networks that do not utilize such energy wells.

One advantage of the use of energy wells is that electrochromic window networks can be designed to operate at lower peak input power than would otherwise be required. The peak input power in such cases may be lower than the power required to simultaneously tint or untint all the electrochromic windows on the network, while the peak output power may still be sufficiently high to simultaneously tint or untint all the windows.

Any type of local energy storage may be used for the energy wells. Examples include supercapacitors and batteries. The energy wells may provide sufficient power to drive one or more optical transitions in one or more windows. In some cases, the energy wells may provide sufficient power to drive an optical transition in as many as about 1, 2, 3, 5, 7, 10, or 12 windows simultaneously. The energy well can discharge at a rate sufficient to drive optical transitions in the relevant window(s) in its domain. The energy well may be capable of providing a particular voltage sufficient to drive optical transitions in the relevant window(s). In various cases the energy well may discharge at a voltage of about 24 V. The power provided to the energy well may be DC power in many cases. In some embodiments, the energy well may include a voltage converter for increasing or decreasing the voltage provided to the energy well. In other cases, the energy well outputs power at the same voltage at which it is received. In certain cases, the energy well may be rated as a class 1 or a class 2 device.

One example of an energy well that may be used as described herein is a supercapacitor. In certain embodiments, a supercapacitor used as an energy well has sufficient energy and power to drive a single optical transition on an associated electrochromic window. The energy well may be integrated into the associated electrochromic window, for example as a part of an individual window controller. In some other cases, the energy well may be separate from the windows and window controllers, positioned at some point (or multiple points) along the power distribution network at a location where it can be used to provide power to one or more windows on the network. Supercapacitors may be deployed for discharge in scenarios where high power but relatively low capacity is needed such as driving a complete transition in a large electrochromic window, e.g., an electrochromic window having a dimension of at least about 50 inches. In some cases, batteries and supercapacitors are used together to complement one another. Batteries often deliver more energy than comparably sized supercapacitors but less power. In various embodiments, the supercapacitor may be recharged over the course of about 4 minutes.

The recharging may be controlled to balance the needs of the system. For instance, if the network is currently using a lot of the available power to drive optical transitions in the windows, an energy well may remain uncharged until a time when there is sufficient excess power available to recharge the energy wells. Further, if the amount of available power is relatively low, the energy wells may be recharged at a relatively lower rate or in increments. In other words, the speed and timing of recharging may be controlled to promote optimal functionality of the electrochromic windows. In this way, a user can operate the windows as desired on demand, and the energy wells can be recharged at times that will not overtax the system.

The number of energy wells used in a particular network may depend on a number of factors including, for example, the maximum power provided by the control panel, the number of windows per control panel, how quickly the optical transitions are driven, the length of wiring connecting the control panel to the windows, the number of wires used to connect to all the windows, the power capacity of the energy wells, etc. Generally, the more energy that can be stored in and supplied by the energy wells, the less power output is needed from the control panel. However, the control panel should have an output capacity sufficient to recharge the energy wells as needed.

In some implementations, an energy well is provided for each window on the network, or for substantially each window on the network. Such energy wells may be implemented as part of an electrochromic window. In other words, the energy well may be integrated into the window, for example integrated into an IGU. In some embodiments, an energy well may be included in a window controller, which may or may not be integrated into the window. In another implementation, a single energy well may supply power for a group of windows. For instance, at least one energy well may be provided for each n windows on the network, where n is between about 2 and about 100, or where n is between about 5 and about 50, or where n is between about 10 and about 30. Energy wells are further described in P.C.T. Patent Application No. PCT/US16/41176 (published as P.C.T. Patent Application Publication No. 2017/007841), titled "POWER MANAGEMENT FOR ELECTROCHROMIC WINDOW NETWORKS," filed on Jul. 6, 2016, which is hereby incorporated by reference in its entirety In some implementations, a power distribution network may also be a communication network. In some implementations, a communication network may share certain components of the power distribution network. Communication networks are configured to provide wireline and/or wireless communication and control information to each window controller (or master controller or network controller) for the purpose of controlling EC window tint states and relaying information. As mentioned previously, power distribution networks are further described in U.S. patent application Ser. No. 15/365,685, titled "POWER DISTRIBUTION NETWORKS FOR ELECTROCHROMIC DEVICES," filed Nov. 30, 2016, which is hereby incorporated by reference in its entirety.

In a building outfitted with one or more PV arrays, instead of relying on the main building power supply to supply power to control panels and ultimately window controllers through the power distribution network, the PV array may supply power to the control panels and the power distribution network to control the electrochromic window network. Additionally, PV-generated irradiance data may be utilized alongside photopic data from other sensors to aid in electrochromic window tint decisions for maximizing energy savings, as discussed below.

Buildings that have PV-power generation capabilities may utilize the power distribution network of an installed electrochromic window network to power other systems, in addition to powering the electrochromic window network, once design load calculations are done to determine the appropriate sizes for PV arrays and battery banks. For example, lighting systems, HVAC systems, and other "Internet of Things" systems such as sensors or entertainment systems may be supplied power by the PV array through the electrochromic window power distribution network. By powering these ancillary systems with PV-generated power through the electrochromic window power distribution network, the power wiring infrastructure in a building is simplified as there is no need to integrate the power distribution networks and required wiring infrastructure from these different systems. Such integration of systems also allows the interrelated building settings, such as window tint level, lighting levels, and temperature levels, to work collectively to maximize energy savings and occupant comfort seamlessly.

Photovoltaic Power Distribution and the Power Distribution Network

Figure 6:
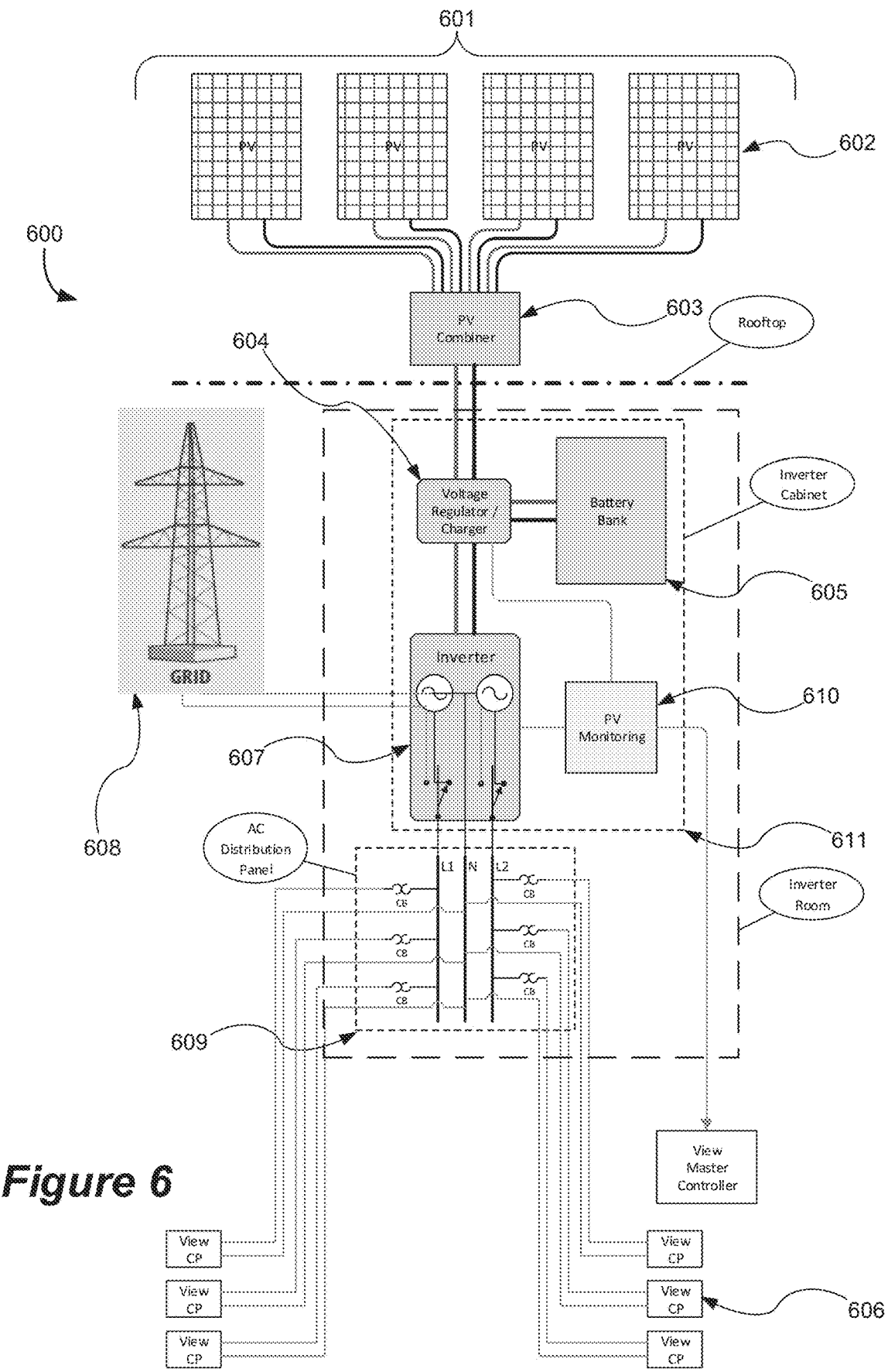
FIG. 6 depicts an example of a photovoltaic-electrochromic system that is grid-supported or hybrid-solar.

FIG. 6 depicts an implementation of the PV-EC system 600 configuration that is grid-assisted or hybrid-solar. In a grid-assisted or hybrid-solar system, power is not fed back into the grid; instead, the system either draws no power from the grid when there is adequate solar energy to charge the battery bank, or the system draws power from the grid when there is not adequate solar energy to run the EC system, for example, to transition EC window tint states or to allow a battery bank to charge from the PV system.

PV array 601 is comprised of a plurality of PV panels 602. PV array 601 generates DC power from sunlight. As mentioned, PV panels typically produce between 240-350 W peak (36 V at 8 A DC) with 16-20% efficiency, are arranged in such a way so as to minimize IR loss in the DC conductors, and are chosen in quantities that allow for battery bank 605 to charge, for example, in a day's time. The DC power generated by each PV panel 602 is collected and combined via PV combiner 603 in order to minimize the wiring to voltage regulator/charger 604, sometimes referred to as a voltage manager, although PV combiner 603 may not be required in smaller installations. The DC power is then supplied to voltage regulator/charger 604 (e.g., a pulse width modulation ("PWM") charger), which regulates the DC current from PV array 601 when charging battery bank 605 and prevents battery bank 605 from overcharging. Battery bank 605 is made of one or more batteries that are designed for deep-cycle applications such as storing and discharging energy for a PV system. Battery bank 605 is utilized to store energy that can be used to, e.g., allow EC window transitions before dawn or dark dusk, or on days of variable cloud cover when PV-power generation may be low, thus minimizing energy drawn from grid 607. It should be understood that a battery bank 605 need not be an electrochemical cell, but may be any device used for storing energy. In some cases, battery bank 605 is a combination of one or more batteries, one or more capacitors, one or more supercapacitors, or any combination thereof. Battery bank 605 may act as an uninterruptible power supply ("UPS") for the window network, by providing stored power when, e.g., solar power is not being generated and/or there is an outage to an electric grid. Because electrochromic windows, such as View, Incorporated's dynamic glass windows, may require only a few volts to transition between tint states, and even less voltage to maintain any particular tint state, battery bank 605 may be sufficient to run the electrochromic window system for many days without the need for energy input from the photovoltaic system. One embodiment is such a system as described herein, where the battery bank is configured to supply, by itself, the window system's power needs for between about 1 day and about 30 days, or for between about 1 day and about 14 days, or between about 1 day and about 7 days.

Inverter 607 takes the DC power from voltage regulator/charger 604 and changes it to AC power, typically 24-600 V DC to 120/240 V AC. Inverter 607 is sized for peak power draw and includes an automatic switch to use power from grid 608 if the batteries in battery bank 605 are not fully charged. If need be, grid 608 provides AC power to the PV-EC system 600 through inverter 607 to allow for battery bank 605 to charge and/or provide power for window transitions. This can be useful in situations such as when there are multiple overcast days in a row that hamper PV-power generation. AC power from inverter 607 is supplied to distribution panel 609, which safely divides inverter AC power output into sub-circuits to feed to individual control panels 606. Control panels 606 have switch-mode power supplies ("SMPS") that change the AC power from distribution panel 609 into DC power, for example, 24 V, which then feeds this DC power through the power distribution network ultimately to window controllers.

Examples of power distribution topologies from control panels to window controllers are described elsewhere with reference to FIGS. 3A-3C, 4, and 5A-5B. In some implementations, PV-EC system 600 may be used to provide PV-generated AC power to other building systems, and in some cases power may be fed back into grid 608—e.g., when the power supply exceeds power demand and battery bank 605 is at a full state of charge.

In some implementations, voltage regulator/charger 604, battery bank 605, inverter 607, and PV monitor 610 may collectively be referred to as power management module 611. PV monitor 610 observes and collects real-time PV data such as solar irradiance data, PV-power generation data, and sensor data, discussed below, through Ethernet, serial, or other communications interfaces, which is then read and processed by the master controller housed within a control panel. Power management module 611 provides end-to-end integration of the system from the PV-power generation and sensing rooftop components, discussed below, through the control logic that drives the system performance, to the EC window network as they mitigate heat and glare throughout the day at the source of heat and glare in a building—the building facade.

Figure 7:
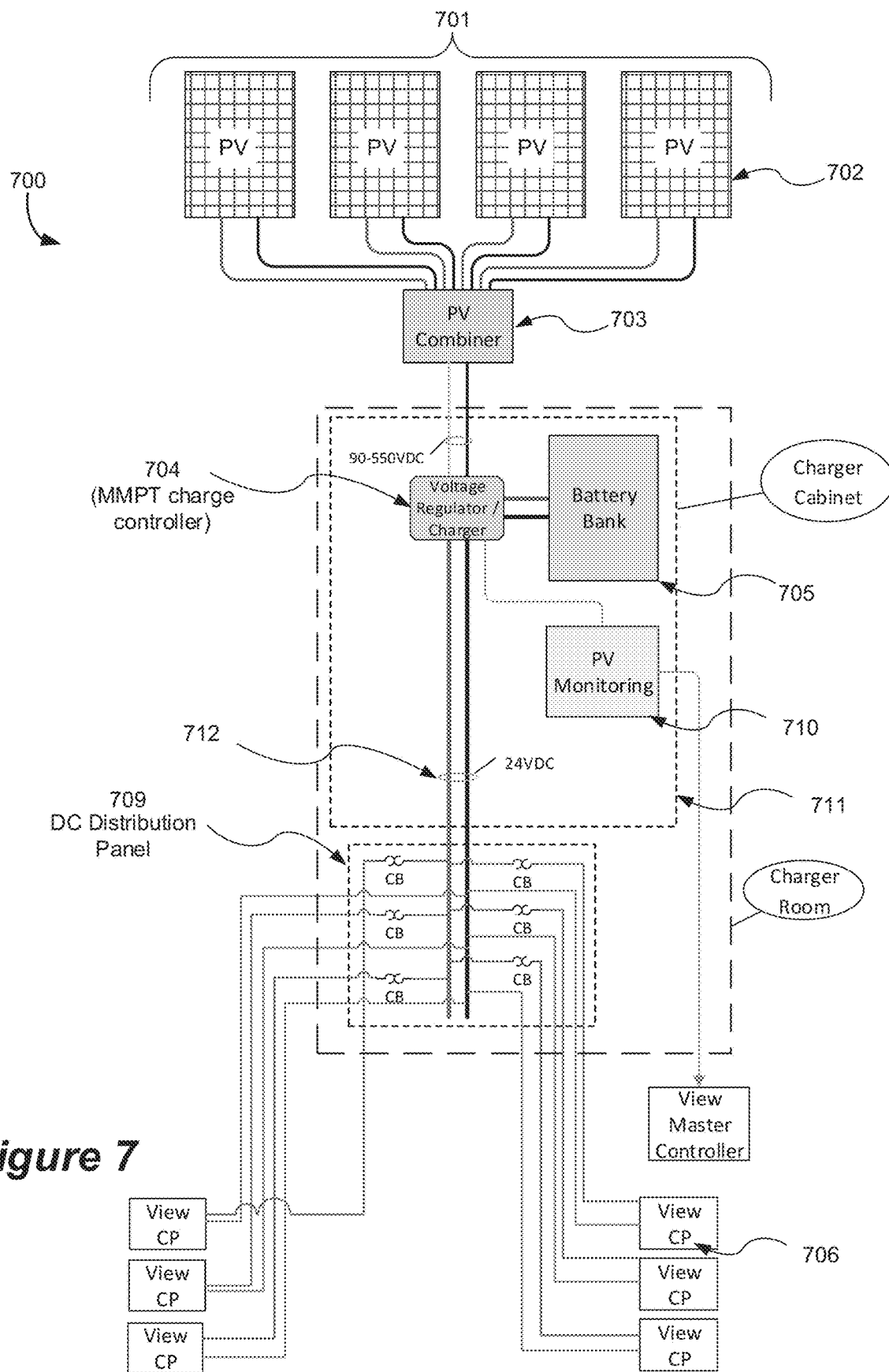
FIG. 7 depicts an example of a photovoltaic-electrochromic system that is off-the-grid ("OTG").

FIG. 7 depicts an implementation of a PV-EC system 700 that directly connects the DC power from the PV array to the power distribution network of the EC window network, allowing for distribution of low voltage DC to EC window network control components. PV-EC system 700 is considered "off the grid," meaning that it does not rely on grid 607 for any power.

PV-EC system 700 operates similarly to PV-EC system 600, except instead of supplying DC power to inverter 607 voltage regulator 704 can provide DC power directly to one or more control panels 706 and/or battery bank 705. In larger systems, a DC distribution panel 709 may be used to distribute power to a plurality of panels. Voltage regulator 704 may be a maximum power point tracking "MPPT" charge manager such as the Conext MPPT 80-600 by Schneider Electric which converts a signal that is high-voltage and low-current to a signal that is low-voltage and high-current to optimize the efficiency at which solar power can be stored in battery bank 705. The voltage produced by PV array 701 may vary depending on factors such as time of day, time of year, ambient air temperature, and temperature of the PV array. Similarly, the optimal voltage for charging a battery bank 705 may vary based on factors such as the state of charge and the state of health of the battery bank. The MMPT charge manager checks the voltage produced by the PV module and the voltage of battery bank 705 to determine the best charging voltage that will result in the maximum current being transferred to battery bank 705. The MMPT charge manager may also be used to provide a specified voltage used by a DC distribution panel 709, a control panels 706, and/or other connected systems. In some embodiments, an MMPT charge manager may provide 24V DC directly to control panels 706 which is then routed to one or more window controllers. Unlike control panels 606 which may convert 120V AC to 24V DC, control panels 706 are provided with DC and dow not need to perform an AC to DC conversion.

PV-EC system 700 avoids power loss when compared with PV-EC system 600, where inverter 607 changes the DC power from voltage regulator/charger 604 to AC power and when the control panel 606 changes the AC power from distribution panel 609 to DC power. By eliminating these DC-AC conversions at inverter 607 and AC-DC conversions at the control panel 606, about 20% less energy is lost throughout the system, with about 10% energy loss at each conversion. Without having to invert or rectify power at any point in the system, system installation logistics simplify without the need to install inverter 607 in PV-EC system 700 or SMPSs in control panels 706 and maximum power generated by PV array 701 is available for system operations. PV monitor 710 and power management module 711 operate in a similar fashion as their counterparts in FIG. 6, with the exception that PV monitor 710 now need only gather information from MPPT charge manager 704. In some embodiments, a PV monitor 710 may share at least some circuitry with the MMPT charge manager 704.

Distributing 24 VDC throughout a building is becoming increasingly popular via ceiling grid power distribution, because it is a more efficient way to power other systems, such as, for example, lighting and sensors. For example, current commercially available low DC voltage distribution systems, such as Ceiling Grid Power™ produced by TE Connectivity Corporation of Berwyn, Pennsylvania and DC Flexzone Grid™ produced by Armstrong World Industries, Inc. of Lancaster, Pennsylvania use the ceiling of a room as a distribution point for low-voltage DC power. These systems may not always take into account a distribution system designed for powering the skin of a building, for example, an EC window network, so a PV-EC system may be used as an alternative; additionally, a ceiling grid may be used synergistically with a PV-EC system such as, for example, PV-EC system 700, to power an EC window network, lighting, and other building systems. As stated, in some implementations, the PV-EC system may be used to power ceiling grids that distribute power to interior lighting and other fixtures, such as, for example, those mounted on a room's ceiling. By powering existing low voltage ceiling power grids with a PV-EC system such as, for example, PV-EC system 700, the ceiling grid can be taken off the AC grid. In these implementations, power may come from, for example, the PV array directly, the battery bank, or distributed energy wells in a distributed energy storage system, discussed below.

Alternatively, in some implementations, power may be delivered to an EC window using photonic power. For example, photonic power may be beamed through an optical fiber or space via a laser beam and into a photonic power converter which converts the light energy to electricity, which is used to transition the EC window via a window controller. Such systems are further described in U.S. patent application Ser. No. 14/423,085 (published as U.S. Patent Publication No. 2015/0219975), titled "PHOTONIC-POWERED EC DEVICES," filed Aug. 23, 2013, which is hereby incorporated by reference in its entirety and for all purposes.

Energy Storage

FIGS. 6 and 7 depict an undistributed energy storage system for an entire building or PV-EC system site, meaning that all of the batteries storing from and providing power to the PV-EC system are located in generally one area of the system. Large energy storage systems that may be used to power all or a sizeable portion of, e.g., a house, a building may be are considered uninterruptible power supplies ("UPSs") as they provide a buffer of stored energy for to provide power when PV—power is not available and/or there is a rolling blackout. UPSs such as Tesla's Powerwall® 2 which incorporates a charger or voltage regulator, storage in the form of Li-ion batteries, and an inverter is an example of an undistributed energy storage system which may be used for home or commercial applications. A typical 3 bedroom house with a 6 kW PV array on the roof combined with two 14 kWh Powerwalls®, typically located centrally together in the garage or other non-occupied space, could essentially run entirely off-grid in certain geographic locations. Rooftop solar is becoming more common in commercial buildings for "load sharing" to reduce consumption during peak hours when energy costs are the highest. Some of these commercial building PV arrays are 250 KW or larger and cover the entire roof of a building. Net zero buildings add energy storage into the system together with rooftop PV-power generation to provide power for lighting and HVAC systems when there is no solar production; such systems can have a 250 kW PV system and 100 kWh energy storage systems. Storage systems are usually sized to support the overnight consumption of a building to minimize the size and expense of the batteries required.

In a distributed titled energy storage system, energy wells may be located and utilized throughout the power distribution network to aid in the delivery of power across the power distribution network. Energy wells (e.g., located with supplemental power panels such as 340 in FIG. 3), may be used to increase both the peak power available to the power distribution network and the maximum rate at which power can be delivered over the power distribution network. Energy wells may be recharged when there is excess power available on the network and are designed to have the capacity and discharge rate that is sufficiently high to power at least a single tint state change on an associated EC window. Energy wells also allow a power distribution network to operate at lower peak input power while still meeting the peak power demand (e.g., the power required to tint or clear all EC windows in the network simultaneously).

In a distributed energy storage system, uninterruptible power supplies ("UPSs") may also be used to provide energy to one or more networks of EC windows when power resources are limited, ensuring that power will be provided to the one or more networks of EC windows during the power resource-limited period. For example, power may be limited in grid-assisted PV-EC systems during a full or partial grid power outage where the battery bank is drained during a long string of overcast days, or during a demand response for energy savings measures. In some implementations, distributed energy storage systems replace the need for a large central battery or battery bank. Energy wells may be physically located proximate to their associated window controllers in the power distribution network and may be in electrical communication with its respective window controller or controllers. When a window controller (or master controller or network controller) receives a trigger signal notifying it of limited power resources, the window controller enters into an intelligent power outage ("IPO") mode. Control and tint operations during the IPO mode are designed to extend the life of the limited power resources, such as those available in a UPS or dedicated energy well, while maximizing comfort and/or safety of the building's occupants. Generally, window controllers remain in IPO mode until standard operating mode can be commenced once the main power supply has restored its supply. UPSs are further described in U.S. patent application Ser. No. 15/320,725, titled "CONTROL METHODS AND SYSTEMS FOR NETWORKS OF OPTICALLY SWITCHABLE WINDOWS DURING REDUCED POWER AVAILABILITY," filed Jun. 30, 2015, which is hereby incorporated by reference in its entirety.

Photovoltaic Arrays as Irradiance Sensors

Figure 8A:
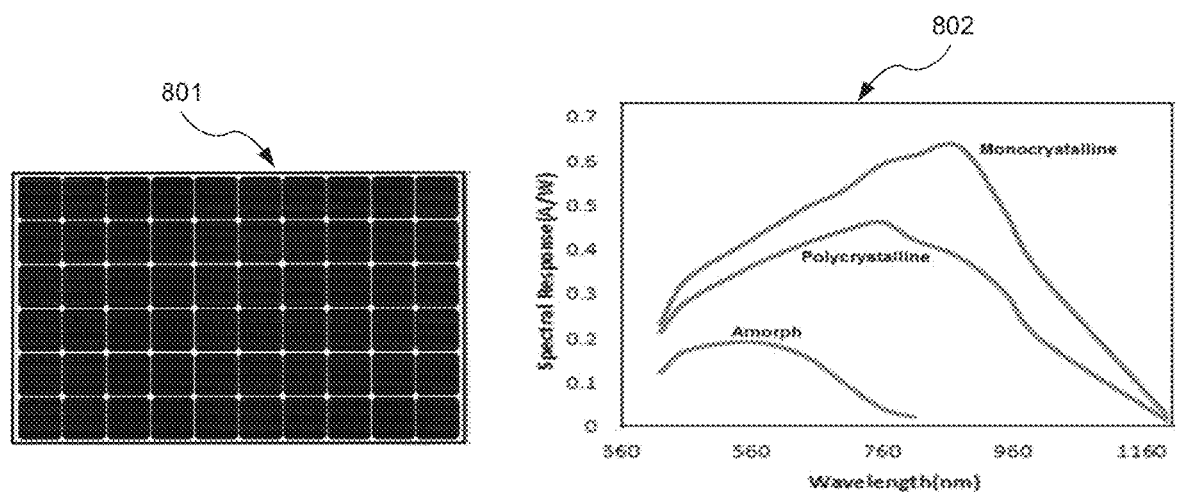
FIG. 8A depicts an example of a PV panel and its spectral response.

Aside from providing power to window controllers in an EC window network via a PV-EC system and power distribution network, PV panels as used herein and thus arrays can also function as solar irradiance sensors. Solar irradiance is the measure of power per unit area, typically $W/m^2$ received from the sun. Solar irradiance measurements can include contributions from the IR, Visible, and/or ultraviolet ("UV") portions of the electromagnetic spectrum. Solar irradiance may be utilized, for example, to determine PV-generated power, incident solar heat gain, weather forecasting, and climate modeling. PV data such as solar irradiance data and PV-power generation data can be monitored by a control panel at the inverter, at voltage regulator/chargers, or at an MPPT charge manager (see FIGS. 6-7). The PV data may be transmitted through Ethernet, serial, or other communications interfaces, then read and processed by the master controller housed within a control panel. With a full spectrum of solar irradiance incident on a specific facade or the roof of a building and the directional information provided by ring sensors, discussed below, a PV-EC system can optimize EC window tint state logic and control through the communications network, discussed above with relation to the power distribution network, for goals such as maximizing building occupant comfort and energy savings. FIG. 8A depicts PV panel 801 alongside spectral response 802, showing the spectral response of amorphous, polycrystalline, and monocrystalline types of PV panels. PV cells as sensors are further described in U.S. patent application Ser. No. 13/449,235 (published as U.S. Patent Application Publication No. 2013/0271812), titled "CONTROLLING TRANSITIONS IN OPTICALLY SWITCHABLE DEVICES," filed Apr. 17, 2012, which is hereby incorporated by reference in its entirety and for all purposes.

Compared to point sensors or other small sensors, PV panels are less susceptible to false readings induced by sensors being blocked by accumulated dirt and debris, and/or shade from a neighboring tree or structure. Furthermore, because PV panels and arrays are constantly monitored for PV-power generation the health of PV cells can be easily monitored, and any deterioration in on or more PV cells can be accounted for when determining measured solar irradiance. For example, an unexpected reduction in power generation over a period of time may indicate degradation in performance of the PV array or panel as a sensor rather than merely a decrease in received solar irradiance. In some cases by accounting for the decreased performance of the cell, the relationship between energy generated and solar irradiance may be calibrated.

The size of a PV array may vary as necessitated by the size and location of an installed PV-EC system, but for a typical mid-sized office building of about 250,000 ft$^2$, the required PV array is 500 ft$^2$. For a small low rise office of fewer than 50,000 ft$^2$, the PV array would be about 70 ft$^2$. Multiple PV arrays may be used to sense solar irradiance over a very wide area, such as, for example, over different areas of a large rooftop. In some cases, PV panels or arrays can be separated by significant distances to provide more accurate solar irradiation received at different windows and/or increase the captured solar energy.

Directionality of Solar Irradiance

Figure 8B:
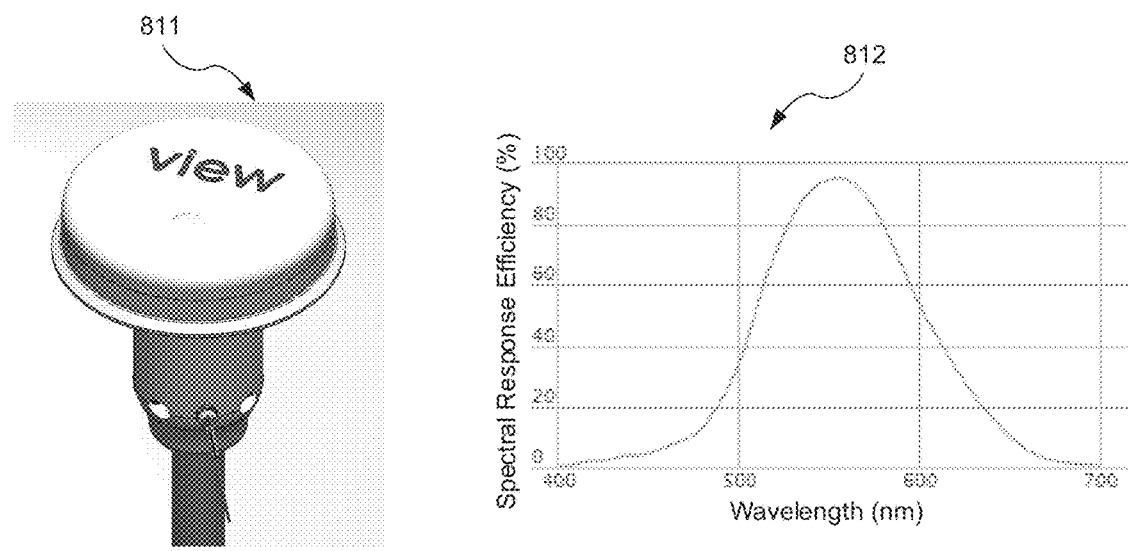
FIG. 8B depicts an example of a ring sensor and its spectral response.

Sensors designed to determine the source direction of solar radiation may also be utilized alongside PV array irradiance sensors to aid control logic for determining EC window tint states and for maximizing PV-power generation. For example, multi-sensor devices, such as orientation independent ring sensors where light sensors are positioned annularly along the exterior of a ring, may be used to accurately determine solar directionality, solar irradiance, and in some cases, lux (a unit of light intensity as perceived by the human eye measured in lumens/m$^2$). In one embodiment, one or more of the light sensors used in the ring sensor are photopic sensors that respond to wavelengths of light that humans are sensitive to and/or have wavelength-specific sensitivity that varies at least partially in the manner of human vision. For example, sensors may respond only to select wavelengths of light so that control enabled by the sensors may be correlated to human perception of light. In certain embodiments, sensors are designed or configured to have such sensitivity by applying appropriate coatings to the sensors. These ring sensors may be placed on the exterior of a structure, for example, on a rooftop, or along a building façade that is alongside or separate from the PV array. FIG. 8B depicts ring sensor 811 alongside its spectral response 822. Ring sensors are further described in U.S. patent application Ser. No. 14/998,019, titled "MULTI-SENSOR," filed Oct. 6, 2015 and U.S. patent application Ser. No. 15/287,646, titled "MULTI-SENSOR," filed Oct. 6, 2016, which are hereby incorporated by reference in their entireties.

View Intelligence®, or the control logic software used to determine EC window tint states as executed by window controllers (or master controllers or network controllers), can combine irradiance and lux measurements to respond to localized solar conditions such as moving clouds, overcast skies, or bright clear days. Because PV-power generation is also significantly influenced by more than just the visible light spectrum, Intelligence® uses real-time PV-power generation data as a gauge for whole sky full spectrum irradiance when paired with directional visible light lux data from ring sensors, thus allowing for optimal dynamic EC window tinting.

PV-EC systems may also make use of the directional lux data and solar irradiance PV data to optimize PV-power generation, in addition to maximizing energy savings and occupant comfort. The location and orientation of a PV array, including its angle with respect to the horizontal and its azimuthal angle, may be rearranged with such data for increased PV-power generation. In some implementations, the location and orientation of the PV array also accounts for sensing functions. For example, a building having multiple PV arrays may have them angled toward different azimuthal directions such as one tilted south, one tilted east, and one tilted west. Furthermore, in implementations where the orientation of PV arrays may be mechanically repositioned, directional lux data may be used to alter the alignment of a PV array such that maximum PV-power generation results due to PV array repositioning its azimuthal and/or horizontal tilt.

Additionally, in some implementations, PV panels need not be positioned to optimize power generation as they are conventionally positioned. In certain implementations, the PV panels are arranged to balance power generation and sensor capability. In some implementations, power generation and sensor capability may both be maximized. In some implementations, power generation may be sufficient to run or charge the system without having been optimized for power generation and sensor function can be optimized by positioning of the PV panels, for example, distributing them about a wider area on a roof and at angles that might differ from where one would put them for only PV power generation and distribution.

Figure 9:
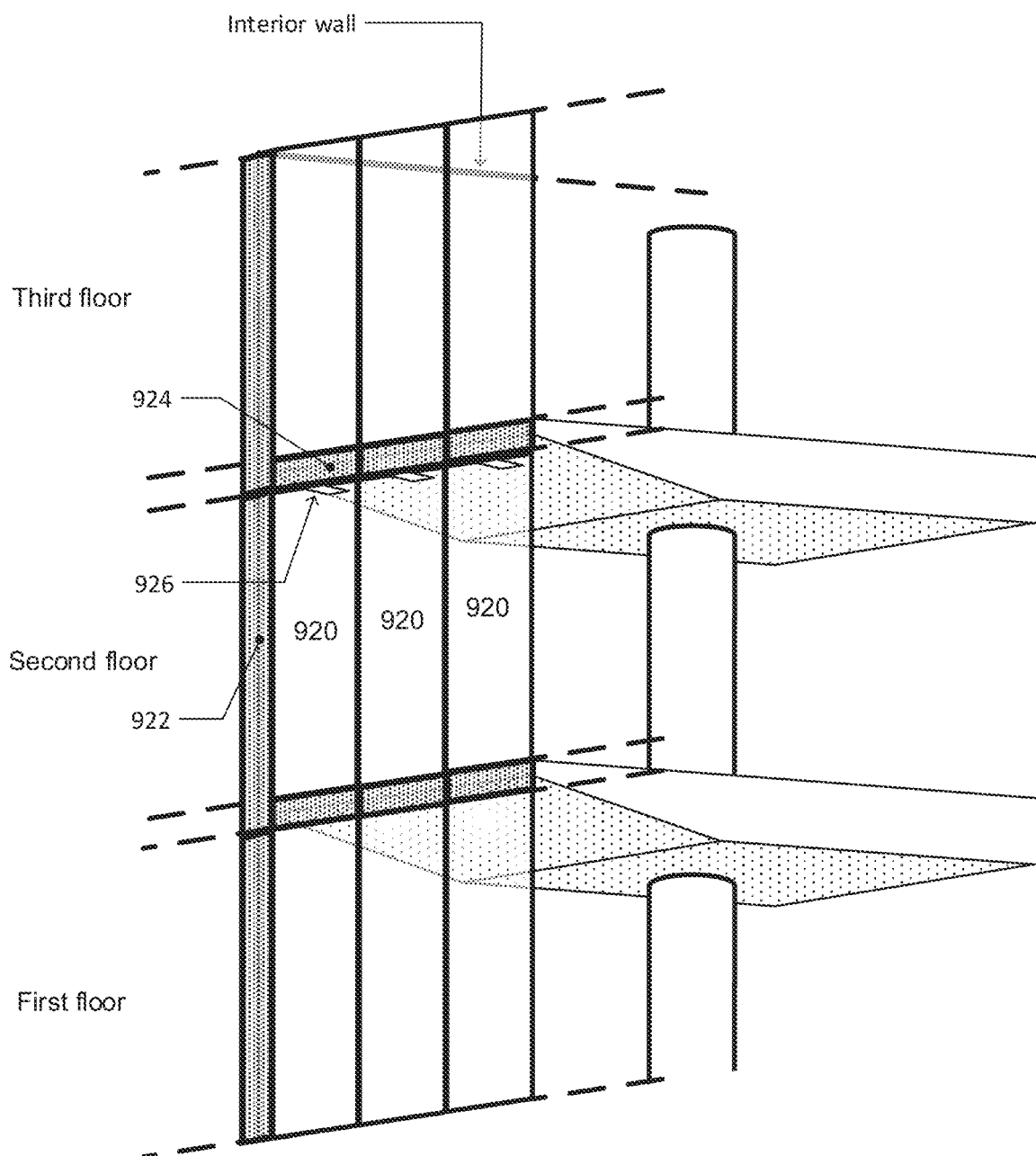
FIG. 9 depicts an example of a photovoltaic-electrochromic system.

As shown in FIG. 9, in some embodiments, PV panels may be integrated with or coupled with spandrels tiles and/or spandrel glass, hereinafter referred to as photovoltaic spandrel glass. Spandrel glass is not for viewing through, but is generally used in a building to conceal structural features (e.g., columns, floors, and walls) and/or to create desired aesthetic effect in a building. For example, large office buildings and skyscrapers often use spandrel glass to create a seamless and uniform exterior appearance. FIG. 9 shows a partial cut-out view of a building with electrochromic windows 920 and photovoltaic spandrel glass which can be located, e.g., in the wall space between rooms on a floor 922, or the space between floor 924. Window controllers 926 are depicted adjacent to each window, but this need not be the case. In some embodiments, PV spandrel glass on a building makes up at least a portion of a PV array used in a grid-supported or hybrid-solar system (e.g., depicted in FIG. 6) or in OTG solar system (e.g., depicted in FIG. 7). In some cases, photovoltaic spandrel glass, roof-top PV arrays, and other PV systems may be separated into different systems, each of which provides power to, e.g., a control panel (302, FIG. 3C), a supplemental control panel (340, FIG. 3C), or the grid. As described elsewhere herein, in some cases, in addition to generating electric power, photovoltaic spandrel glass can also be used to measure solar irradiance. In some cases, intelligence may account for irradiance data provided by photovoltaic spandrel glass in close proximity to a window when controlling the window's tint state.

In some embodiments, photovoltaic spandrel includes architectural glass (e.g., glass that matches the appearance of nearby windows) covering the surface of one or more PV cells or arrays underneath. In some cases, photovoltaic spandrel glass is made of a layered glass structure that is all solid-state and inorganic. In some cases, photovoltaic spandrel glass includes transparent PV Cells that harvest solar energy from invisible wavelengths of light. In some cases, a photovoltaic spandrel glass may simply be a PV panel that is acceptable in appearance to a building owner. Use of photovoltaic spandrel glass may be ideal for, e.g., retrofit applications where a building is upgraded with an electrochromic window network. In such cases, spandrel glass may be replaced with photovoltaic spandrel glass which may share, at least in part, the wiring infrastructure of power distribution networks described herein.

Intelligence® may base its decisions to tint an EC window based on a variety of factors. For example, Intelligence® may utilize real-time irradiance values from PV arrays, position of the sun from ring sensors, time of day and date, the EC window's current solar heat gain coefficient ("SHGC") which measures the solar heat transmittance through the window, and window properties such as window dimensions and orientation in the building, to determine what the appropriate EC window tint level is to maximize a room occupant's comfort in a building by reducing sunlight or glare and solar heat entering the room. For example, if solar power generation nears or meets a seasonal maximum or design capacity, Intelligence® may assume that the skies are clear and that no override is necessary. However, as solar power generation diminishes below seasonal or design maximums, Intelligence® can respond accordingly. Intelligence® is further described in U.S. Pat. No. 9,454,055, titled "MULTIPURPOSE CONTROLLER FOR MULTISTATE WINDOWS," filed on Mar. 16, 2011, U.S. patent application Ser. No. 14/932,474 (published as U.S. Patent Application Publication No. 2016/0054634), titled "MULTIPURPOSE CONTROLLER FOR MULTISTATE WINDOWS," filed on Nov. 4, 2015, U.S. patent application Ser. No. 14/163,026 (published as U.S. Patent Application Publication No. 2014/0268287), titled "CONTROLLING TRANSITIONS IN OPTICALLY SWITCHABLE DEVICES," filed on Jan. 24, 2014, U.S. patent application Ser. No. 14/535,080 (published as U.S. Patent Application Publication No. 2015/0060648), titled "CONTROLLING TRANSITIONS IN OPTICALLY SWITCHABLE DEVICES," filed on Nov. 6, 2014, U.S. patent application Ser. No. 14/993,822 (published as U.S. Patent Application Publication No. 2016/0124283), titled "CONTROLLING TRANSITIONS IN OPTICALLY SWITCHABLE DEVICES," filed on Jan. 22, 2016, U.S. patent application Ser. No. 14/931,390 (published as U.S. Patent Application Publication No. 2016/0054633), titled "CONTROLLING TRANSITIONS IN OPTICALLY SWITCHABLE DEVICES," filed on Nov. 3, 2015, U.S. patent application Ser. No. 13/772,969 (published as U.S. Patent Application Publication No. 2014/0236323), titled "CONTROL METHOD FOR TINTABLE WINDOWS," filed on Feb. 21, 2013, U.S. patent application Ser. No. 15/347,677, titled "CONTROL METHOD FOR TINTABLE WINDOWS," filed on Nov. 19, 2016, U.S. Patent Application No. 62/434,826, titled "CONTROL METHOD FOR TINTABLE WINDOWS," filed on Dec. 15, 2016, P.C.T. Patent Application No. PCT/US16/55005, titled "METHODS OF CONTROLLING MULTI-ZONE TINTABLE WINDOWS," filed Sep. 30, 2016, and P.C.T. Patent Application No. PCT/US16/41344 (published as P.C.T. Patent Application Publication No. 2017/007942), titled "CONTROL METHOD FOR TINTABLE WINDOWS," filed on Jul. 7, 2016, which are hereby incorporated by reference in their entireties and for all purposes.

PV-EC systems may also share site monitoring data such as directional lux and solar irradiance data with other PV-EC system sites by any networking interfaces, such as, for example, wireline connections, wireless connections, or through cloud computing. By pooling together data from multiple PV-EC system sites, PV-EC systems may learn how to better generate and conserve energy, predict and respond to weather patterns, and monitor the integrity of system components from different sites. Site monitoring systems are further described in U.S. patent application Ser. No. 15/123,069, titled "MONITORING SITES CONTAINING SWITCHABLE OPTICAL DEVICES AND CONTROLLERS," filed Mar. 5, 2015, which is hereby incorporated by reference in its entirety and for all purposes.

We claim:

1. A method of providing power to a plurality of optically switchable windows in a building, the method comprising:
   generating electric power for one or more of the plurality of optically switchable windows with a photovoltaic spandrel glass comprising at least one photovoltaic array integrated with spandrels tiles and/or spandrel glass.

2. The method of claim 1, further comprising
   receiving, at a voltage regulator, electric power from the photovoltaic array and apply, with the voltage regulator, a charge signal to an energy storage device, and
   generating a DC output signal using power stored in the energy storage device and/or power from the photovoltaic array;
   controlling tint states of the plurality of optically switchable windows with one or more window controllers; and
   receiving power from the DC output signal with one or more control panels and providing power from the one or more control panels to the one or more window controllers.

3. The method of claim 2 wherein the one or more control panels comprise a master controller, and further comprising issuing instructions with the master controller to the one or more window controllers for controlling the tint states of the plurality of optically switchable windows.

4. The method of claim 3, further comprising:
   receiving, at the master controller, photopic data and/or directional lux data from one or more sensors, and basing the issued instructions at least in part on the photopic data and/or the directional lux data.

5. The method of claim 4, further comprising:
receiving, at the master controller, directional lux data, and wherein the master controller utilizes the directional lux data reposition the photovoltaic array into a direction and orientation that approximately maximizes electric power generation.

6. The method of claim 3, further comprising:
gathering, with a photovoltaic monitor coupled to the photovoltaic array, irradiance data from the photovoltaic array, and basing the issued instructions at least in part on the irradiance data.

7. The method of claim 2, further comprising receiving, at a DC distribution panel, the DC output signal from the voltage regulator and distributing power to the one or more control panels.

8. The method of claim 7, further comprising delivering, with the DC distribution panel, power to one or more non-electrochromic window systems.

9. The method of claim 2, further comprising interacting, with an inverter, a power grid and converting the DC output signal to an alternating current (AC) output.

10. The method of claim 9, further comprising:
dividing and distributing the AC output to one or more control panels with an AC distribution panel coupled to the inverter;
receiving power, at the one or more control panels, from the AC distribution panel; and
converting AC power to DC power.

11. The method of claim 9, wherein the interacting includes the inverter feeding power back into the power grid and the power grid providing power to the inverter.

12. The method of claim 2, wherein the energy storage device comprises one or more batteries configured for deep-cycle applications, further comprising the voltage regulator preventing overcharging of the one or more batteries.

13. The method of claim 1, wherein the photovoltaic array comprises at least two photovoltaic panels, the at least two photovoltaic panels having a different selectivity to wavelengths of light, and further comprising using the different selectivity of the at least two photovoltaic panels to determine or estimate a full spectrum of solar irradiance received by the building.

14. A building comprising:
a plurality of optically switchable windows; and
at least one photovoltaic spandrel glass comprising at least one photovoltaic array integrated with spandrels tiles and/or spandrel glass, the photovoltaic array being configured to generate electric power for one or more of the plurality of optically switchable windows.

15. The building of claim 14, further comprising:
an energy storage device;
a voltage regulator configured to:
receive electric power from the photovoltaic array and apply a charge signal to the energy storage device, and
generate a DC output signal using power stored in the energy storage device and/or power from the photovoltaic array;
one or more window controllers configured to control tint states of the plurality of optically switchable windows; and
one or more control panels configured to receive power from the DC output signal and provide power to one or more window controllers.

16. The building of claim 15, further comprising a photovoltaic combiner coupled with the photovoltaic array and the voltage regulator, the photovoltaic combiner configured to minimize wiring to the voltage regulator.

17. The building of claim 15 wherein the one or more control panels comprise a master controller configured to issue instructions to the one or more window controllers for controlling the tint states of the plurality of optically switchable windows.

18. The building of claim 17, wherein the master controller is further configured to receive photopic data and/or directional lux data from one or more sensors, and wherein the issued instructions are based at least in part on the photopic data and/or the directional lux data.

19. The building of claim 18, wherein at least one of the one or more sensors is located in a different building.

20. The building of claim 19, wherein the one or more sensors comprise a ring sensor.

21. The building of claim 14, wherein the photovoltaic array comprises at least two photovoltaic panels, the at least two photovoltaic panels having a different selectivity to wavelengths of light, and wherein different selectivity of the at least two photovoltaic panels is used to determine or estimate a full spectrum of solar irradiance received by the building.

22. The building of claim 21, wherein the photovoltaic panels have a different selectivity to wavelengths of light based on their bandgap energies or an optical filter.

23. The building of claim 15, further comprising a DC distribution panel configured to receive the DC output signal from the voltage regulator and distribute power to the one or more control panels.

24. The building of claim 23, wherein the DC distribution panel is further configured to deliver power to one or more non-electrochromic window systems.

25. The building of claim 24, further comprising a 24-volt direct current (DC) distribution grid for delivering power to the one or more control panels and/or the one or more non-electrochromic systems.

26. The building of claim 25, further comprising an inverter configured to interact with a power grid and convert the DC output signal to an alternating current (AC) output.

27. The building of claim 25, wherein the voltage regulator is a pulse width modulation (PWM) controller or a maximum power point tracking (MPPT) controller.

* * * * *